United States Patent
Tombez

(10) Patent No.: US 11,846,915 B2
(45) Date of Patent: *Dec. 19, 2023

(54) TIMEPIECE COMPRISING A MECHANICAL OSCILLATOR ASSOCIATED WITH A REGULATION SYSTEM

(71) Applicant: The Swatch Group Research and Development Ltd, Marin (CH)

(72) Inventor: Lionel Tombez, Bevaix (CH)

(73) Assignee: The Swatch Group Research and Development Ltd, Marin (CH)

( * ) Notice: Subject to any disclaimer, the term of this patent is extended or adjusted under 35 U.S.C. 154(b) by 1402 days.

This patent is subject to a terminal disclaimer.

(21) Appl. No.: 16/222,124

(22) Filed: Dec. 17, 2018

(65) Prior Publication Data

US 2019/0187624 A1 Jun. 20, 2019

(30) Foreign Application Priority Data

Dec. 20, 2017 (EP) .................................. 17209138

(51) Int. Cl.
*G04C 11/00* (2006.01)
*G04C 10/00* (2006.01)
(Continued)

(52) U.S. Cl.
CPC .............. *G04C 11/00* (2013.01); *G04C 3/047* (2013.01); *G04C 3/06* (2013.01); *G04C 10/00* (2013.01); *H02M 3/07* (2013.01)

(58) Field of Classification Search
CPC .......... G04C 3/16; G04C 3/165; G04C 10/00; G04F 5/10
See application file for complete search history.

(56) References Cited

U.S. PATENT DOCUMENTS 3,407,344 A * 10/1968 Bansho .................. G04C 3/069
                                                              968/479
3,487,629 A *  1/1970 Yoshifumi .............. G04C 3/065
                                                              318/132
(Continued)

FOREIGN PATENT DOCUMENTS

EP        1 241 538 A1     9/2002

OTHER PUBLICATIONS

European Search Report dated May 25, 2018 in European Application 17209138.1, filed on Dec. 20, 2017 (with English Translation of Categories of Cited Documents).

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece includes a mechanical oscillator and an electromechanical transducer formed by an electromagnetic assembly including a coil and a magnet mounted on the balance of the mechanical oscillator. The induced voltage signal, produced by the electromagnetic transducer during each oscillation, exhibits, in a first half-alternation between the oscillator passes via the neutral position thereof, a first lobe of maximum amplitude having a first polarity and, in a second half-alternation following a passage via the neutral position, a second lobe of maximum amplitude having a second polarity opposite the first. An electric converter includes two power supply capacitors and a device for regulating the medium frequency of the mechanical oscillator. The first power supply capacitor is charged merely with a positive voltage whereas the second capacitor is charged merely with a negative voltage. A load pump is arranged to transfer electric loads between the two capaci- (Continued)

tors according to a time drift of the mechanical oscillator relative to a time base.

15 Claims, 11 Drawing Sheets

(51) Int. Cl.
*G04C 3/04* (2006.01)
*G04C 3/06* (2006.01)
*H02M 3/07* (2006.01)

(56) References Cited

U.S. PATENT DOCUMENTS

| | | | | |
|---|---|---|---|---|
| 3,538,704 A * | 11/1970 | Toyoji | | G04C 3/067 318/130 |
| 3,670,492 A * | 6/1972 | Takamune | | G04C 3/065 368/163 |
| 3,696,258 A * | 10/1972 | Anderson | | H02N 1/004 55/DIG. 39 |
| 3,803,829 A * | 4/1974 | Tsuruishi | | G04C 3/067 318/132 |
| 6,194,876 B1 * | 2/2001 | Nagata | | H02P 9/30 322/5 |
| 7,016,265 B2 * | 3/2006 | Born | | G04C 3/066 368/162 |
| 7,306,364 B2 * | 12/2007 | Born | | G04C 11/084 368/204 |
| 11,422,510 B2 * | 8/2022 | Tombez | | G04B 17/06 |
| 2005/0036405 A1 * | 2/2005 | Born | | G04B 17/063 368/127 |
| 2005/0128881 A1 * | 6/2005 | Gueissaz | | G04C 10/00 368/204 |
| 2013/0051191 A1 * | 2/2013 | Schafroth | | G04C 3/047 368/175 |
| 2018/0181073 A1 * | 6/2018 | Tombez | | G04C 3/04 |

* cited by examiner

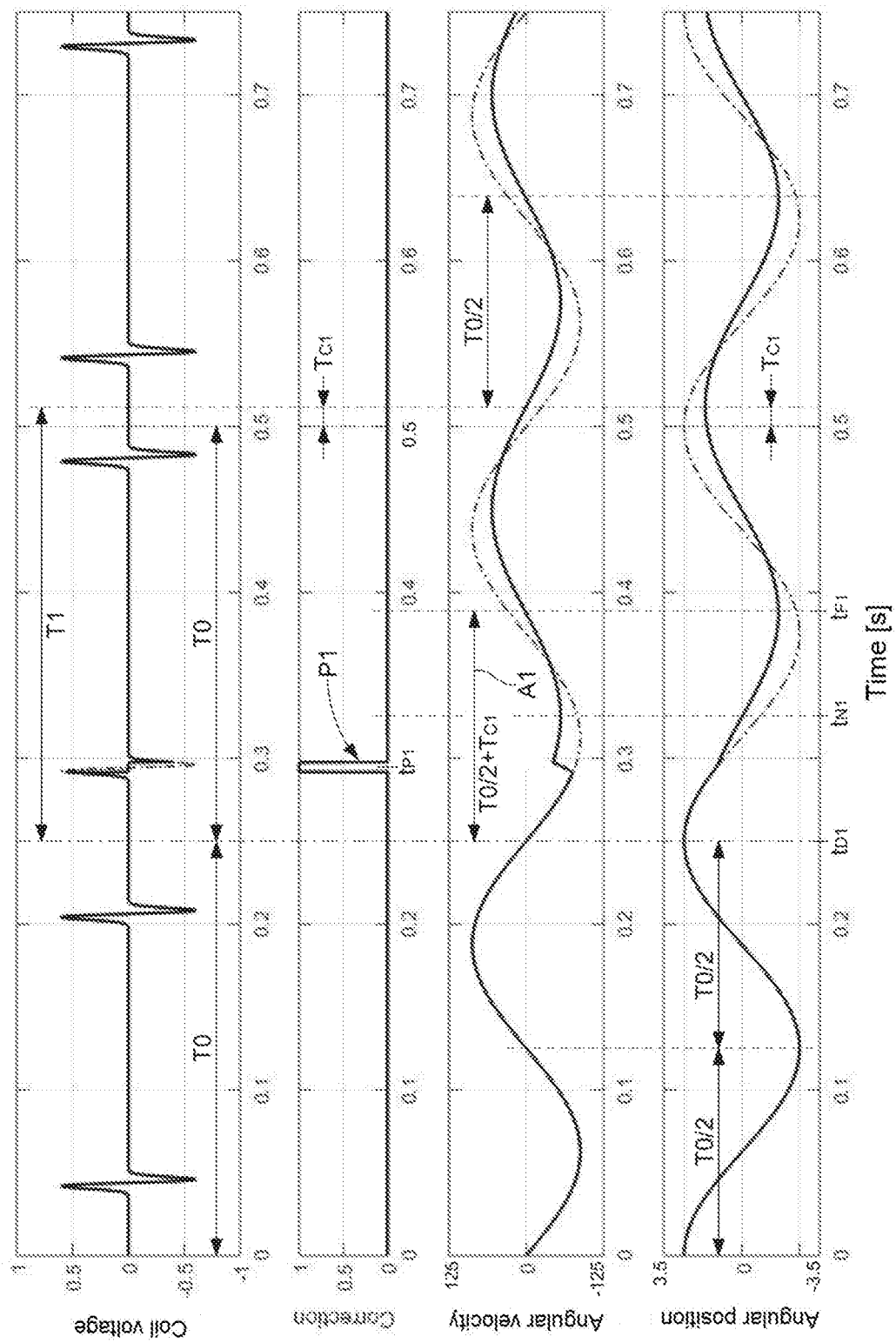

Fig. 9
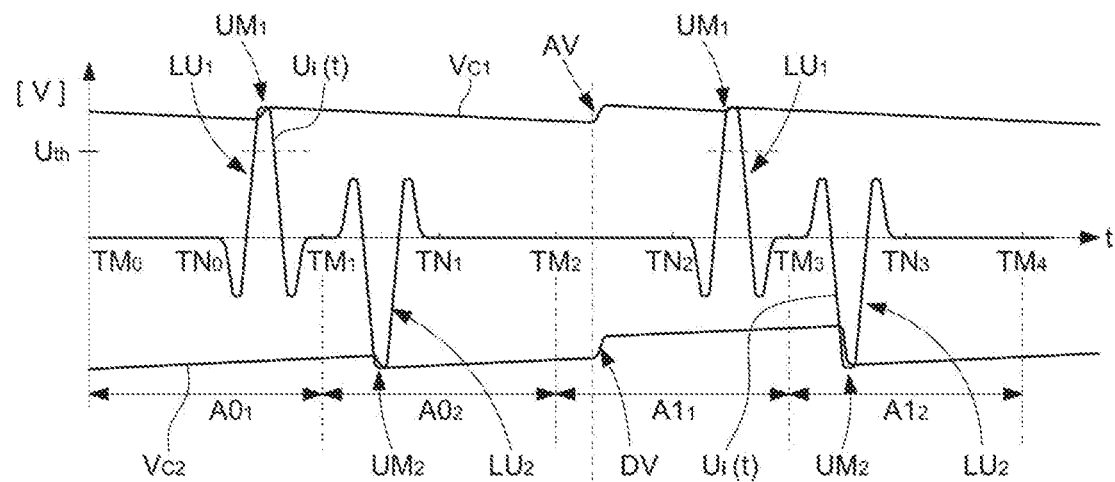
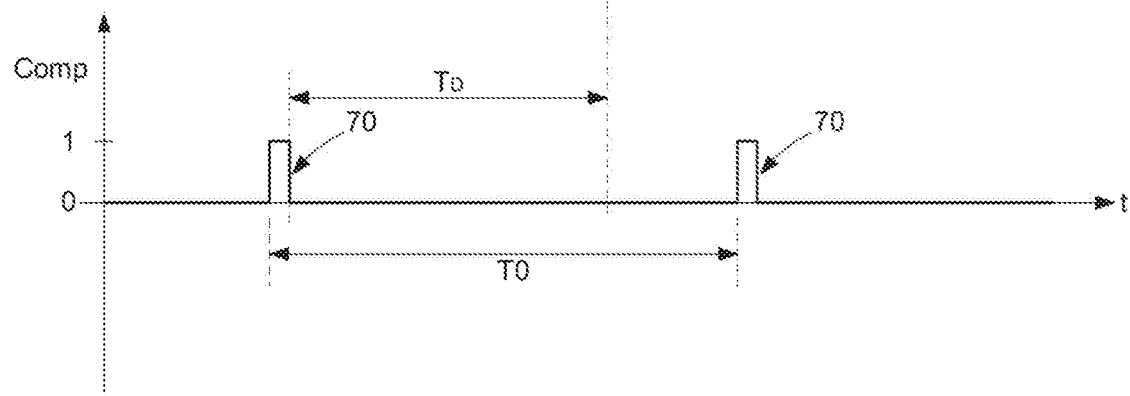
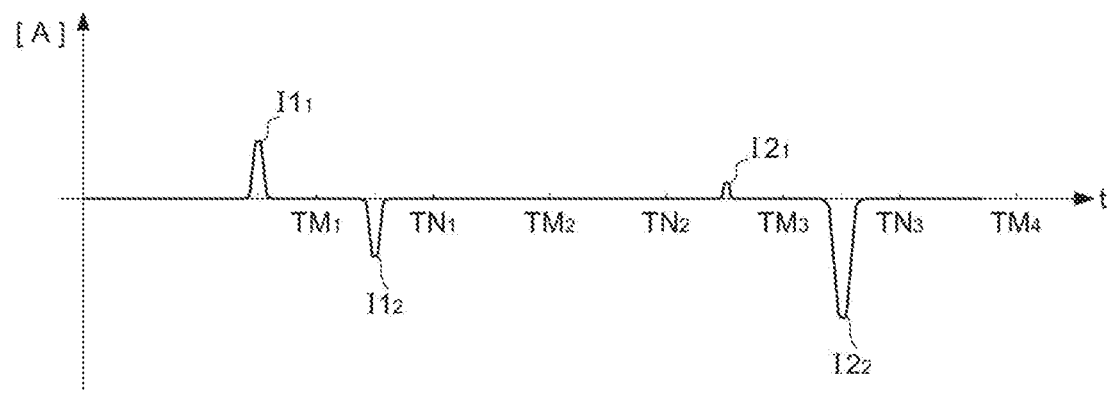

TIMEPIECE COMPRISING A MECHANICAL OSCILLATOR ASSOCIATED WITH A REGULATION SYSTEM

CROSS-REFERENCE TO RELATED APPLICATION

This application claims priority to European Patent Application No. 17209138.1 filed on Dec. 20, 2017, the entire disclosure of which is hereby incorporated herein by reference.

TECHNICAL FIELD

The present invention relates to a timepiece comprising a mechanical oscillator associated with a system for regulating the medium frequency thereof. The regulation is of the electronic type, i.e. the regulation system comprises an electronic circuit connected to an auxiliary oscillator which is arranged to supply a high-precision electric clock signal. The regulation system is arranged to correct a potential time drift of the mechanical oscillator relative to the auxiliary oscillator.

In particular, the mechanical oscillator comprises a mechanical resonator formed by a balance-spring and a maintenance device formed by a conventional escapement, for example having Swiss pallets. The auxiliary oscillator is formed particularly by a quartz resonator or by a resonator integrated in the electronic regulation circuit.

TECHNOLOGICAL BACKGROUND

Movements forming timepieces as defined in the field of the invention have been proposed in some prior documents. The patent CH 597 636, published in 1977, proposes such a movement with reference to FIG. 3 thereof. The movement is equipped with a resonator formed by a balance-spring and a conventional maintenance device comprising pallets and an escapement wheel kinematically linked with a barrel equipped with a spring. This timepiece movement comprises a system for regulating the frequency of the mechanical oscillator. This regulation system comprises an electronic circuit and an electro-magnetic assembly formed from a flat coil, arranged on a support arranged under the felloe of the balance, and from two magnets mounted on the balance and arranged close to one another so as to both pass over the coil when the oscillator is activated.

The electronic circuit comprises a time base comprising a quartz generator and serving to generate a reference frequency signal FR, this reference frequency being compared with the frequency FG of the mechanical oscillator. The frequency FG of the oscillator is detected via the electrical signals generated in the coil by the pair of magnets. The regulation circuit is suitable for momentarily inducing a braking torque via a magnetic magnet-coil coupling and a switchable load connected to the coil. The document CH 597 636 provides the following teaching: "The resonator formed should have a variable oscillation frequency according to the amplitude on either side of the frequency FR (isochronism error)". It is therefore taught that a variation in the oscillation frequency of a non-isochronous resonator is obtained by varying the oscillation amplitude thereof. An analogy is made between the oscillation amplitude of a resonator and the angular velocity of a generator comprising a rotor equipped with magnets and arranged in a geartrain of the timepiece movement in order to regulate the running thereof. As a braking torque reduces the rotational speed of such a generator and thus the rotational frequency thereof, it is herein merely envisaged to be able to reduce the oscillation frequency of an obligatorily non-isochronous resonator by applying a braking torque reducing the oscillation amplitude thereof.

To perform electronic regulation of the frequency of the generator, or of the mechanical oscillator, it is envisaged in a given embodiment that the load is formed by a switchable rectifier via a transistor which loads a storage capacitor during braking pulses, to retrieve the electricity so as to power the electronic circuit. The consistent teaching given in the document CH 597 636 is as follows: When FG>FR, the transistor is conductive; a power Pa is then drawn from the generator/oscillator When FG<FR, the transistor is non-conductive; therefore, power is no longer drawn from the generator/oscillator. In other words, regulation is merely performed when the frequency of the generator/of the oscillator is greater than the reference frequency FR. This regulation consists of braking the generator/oscillator with the aim of reducing the frequency FG thereof. Thus, in the case of the mechanical oscillator, those skilled in the art understand that regulation is only possible when the barrel spring is strongly armed and that the free oscillation frequency (natural frequency) of the mechanical oscillator is greater than the reference frequency FR, resulting from a voluntary isochronism error of the selected mechanical oscillator. Therefore, there is a two-fold problem, i.e. the mechanical oscillator is selected for that which is usually an error in a mechanical movement and the electronic regulation is only functional when the natural frequency of this oscillator is greater than a nominal frequency.

The patent application EP 1 521 142 also relates to the electronic regulation of a balance-spring. The regulation system proposed in this document is similar in the general functioning thereof to that of the patent CH 597 636.

The patent application EP 1 241 538 teaches that the braking moment of the mechanical oscillator, during a vibration of any oscillation thereof, makes it possible either to reduce the value of the current oscillation period, or increase same. To do this, an electromagnetic magnet-coil assembly and a control circuit which is arranged to render the coils conductive or not during certain defined time intervals is provided. As a general rule, braking of the mechanical oscillator, by generating an electric power in the coils during magnet-coil coupling, during an oscillation period gives rise either to an increase in the corresponding period when this braking occurs prior to the passage of the mechanical resonator via the neutral point thereof (rest position), or to a decrease in the corresponding period when this braking occurs after the passage of the mechanical resonator via the neutral point thereof. This observation is remarkable in the light of the teaching prevailing at the time.

In relation to the implementation of an electronic regulation making use of the above-mentioned observation, the document EP 1 241 538 proposes two embodiments. In these two embodiments, a piezo-electric system is provided associated with the escapement to detect tipping of the pallets thereof in each oscillation period. By means of such a detection system, it is envisaged, on one hand, to compare the oscillation period with a reference period, defined by a quartz oscillator, to determine whether the running of the timepiece exhibits a gain or a loss and, on the other, to determine in one vibration out of every two the passage of the mechanical oscillator via the neutral point thereof. In the first embodiment, according to whether the time drift corresponds to a gain or a loss, it is envisaged to render the coils conductive for a certain time interval respectively before or after the passage via the neutral position of the mechanical oscillator in a vibration. In other words, it is envisaged herein to short-circuit the coils before or after the passage via the neutral position according to whether the regulation requires respectively an increase or a decrease of the oscillation period.

In the second embodiment, it is envisaged to power the regulation system by periodically drawing energy from the mechanical oscillator via the electromagnetic assembly. For this purpose, the coils are connected to a rectifier which is arranged to recharge a condenser (storage capacitor), which serves as a power supply source for the electronic circuit. The electromagnetic assembly is that given in FIGS. 2 and 4 and the electronic circuit is represented schematically in FIG. 5 of this document. The only indications given for the functioning of the regulation system are as follows: 1) the coils are rendered conductive during constant time intervals which are centered on respective passages of the mechanical resonator (balance-spring) via the neutral position thereof (median vibration position); 2) during these time intervals, an induced current is rectified and stored in the condenser; and 3) during said time intervals, the oscillation period of the balance-spring may be regulated effectively by adjusting the power generated by the induced current, without any further details being provided.

It may be considered that the choice of coil conduction intervals centered on the neutral positions of the mechanical resonator has the objective of not inducing a parasitic time drift in the mechanical oscillator by drawing energy therefrom to power the electronic circuit. By rendering the coils conductive for the same duration before and after the passage via the neutral position, the author maybe thinks to poise the effect of a braking preceding such a passage via the neutral position with the effect of a braking following this passage to thus not modify the oscillation period in the absence of a regulation circuit correction signal arising from the measurement of a time drift. One may have strong doubts that this is achieved with the electromagnetic assembly disclosed and a conventional rectifier connected to a storage capacitor. Firstly, the recharging of this storage capacitor is dependent on the initial voltage thereof at the start of a given time interval. Subsequently, the induced voltage and the induced current in the coils vary in intensity with the angular velocity of the balance-spring, this intensity decreasing on moving away from a neutral position where the angular velocity is maximum. The electromagnetic assembly disclosed makes it possible to determine the shape of the induced voltage/induced current signal. Although the angular position of the magnets relative to the coils for the neutral position (rest position) is not given and it is not possible to infer a teaching on the signal phase, it may be inferred that the recharging of the storage capacitor will usually take place mostly prior to the passage via the neutral position. Thus, a braking results therefrom which is not symmetrical relative to the neutral position and a parasitic loss in the running of the timepiece. Finally, as regards the adjustment of the induced power during the constant time intervals envisaged to regulate the running of the timepiece, no indications are given. One does not understand how such an adjustment is made, no teaching being given on this matter.

SUMMARY OF THE INVENTION

A general aim, within the scope of the development resulting in the present invention, was that of producing a timepiece, comprising a mechanical movement with a mechanical oscillator and an electronic system for regulating this mechanical oscillator, for which it is not necessary to initially put the mechanical oscillator out of order to put it forward, in order to thus obtain a timepiece which has the precision of an auxiliary electronic oscillator (particularly equipped with a quartz resonator) when the regulation system is operational and, otherwise, the precision of the mechanical oscillator corresponding to the best standard. In other words, it is sought to adjoin electronic regulation to a mechanical movement regulated as accurately as possible moreover such that it remains operational, with the best possible running, when the electronic regulation is inactive.

The first aim of the present invention is that of providing a timepiece of the type described above, wherein the regulation system consumes relatively little electrical energy and thus enables effective self-powering of this regulation system by a lower electrical energy drawn from the mechanical oscillator of the timepiece, regardless of the magnitude of a time drift to be corrected in a range of values envisaged to be suitable for correction.

A further aim is that of providing a timepiece of the type described above, which is capable, for a defined electromagnetic assembly, of supplying an electrical power supply energy and continuously a power supply voltage which are sufficient to ensure the proper functioning of the regulation system, particularly in the absence of time drift correction.

One particular aim is that of providing such a timepiece which is capable, for a defined electromagnetic assembly, of supplying continuously an electrical power supply voltage which remains substantially maximum regardless of the time drift correction of this timepiece performed by the regulation system.

A further particular aim is that of ensuring self-powering of the regulation system without inducing a parasitic time drift, in particular in the absence of time drift correction, or at least such that any such parasitic time drift remains minimal and negligible.

To this end, the present invention relates to a timepiece comprising:
  a mechanism, particularly a time indication mechanism,
  a mechanical resonator suitable for oscillating about a neutral position corresponding to the minimal mechanical potential energy state thereof, each oscillation of the mechanical resonator defining an oscillation period and having two successive vibrations each between two extreme positions which each define the oscillation amplitude of the mechanical resonator, each vibration having a passage of the mechanical resonator via the neutral position thereof (rest position/minimal mechanical energy position) at a median time and consisting of a first half-vibration between an initial time of this vibration and the median time thereof and a second half-vibration between this median time and an end time of this vibration.
  a maintenance device of the mechanical resonator forming therewith a mechanical oscillator which defines the running speed of said mechanism,
  an electromechanical transducer arranged to be able to convert mechanical power from the mechanical oscillator into electrical power, in particular when the mechanical resonator oscillates with an amplitude included in an effective functioning range, this electromagnetic transducer being formed by an electromagnetic assembly comprising at least one coil, mounted on an element from the mechanical assembly consisting of the mechanical resonator and the support thereof, and at least one magnet, mounted on the other element of this mechanical assembly, the electromagnetic assembly being arranged so as to be able to supply an induced voltage signal between the two output terminals of the electromechanical transducer when the mechanical resonator oscillates with an amplitude included in said effective functioning range, an electric converter connected to the two output terminals of the electromechanical transducer so as to be able to receive an induced current therefrom, this electric converter comprising a power supply unit arranged to be able to store the electrical energy supplied by the electromechanical transducer, this electromechanical transducer and the electric converter forming a braking device of the mechanical resonator together, a load connected or suitable for being regularly connected to the power supply unit so as to be able to be powered by this power supply unit, a device for regulating the frequency of the mechanical oscillator, this regulating device comprising an auxiliary oscillator and a measuring device arranged to be able to detect a potential time drift of the mechanical oscillator relative to the auxiliary oscillator, the regulating device being arranged to be able to determine whether the time drift measured corresponds to at least one certain gain.

The timepiece according to the invention is characterized in that:

the power supply unit comprises a first power supply capacitor and a second power supply capacitor, both arranged to power said load, and the electric converter is formed by a first electrical energy storage circuit, which comprises the first power supply capacitor and which is arranged to be able to recharge this first power supply capacitor merely with a voltage having a first polarity at the input of the electric converter, and by a second electrical energy storage circuit which comprises the second power supply capacitor and which is arranged to be able to recharge this second power supply capacitor merely with a voltage having a second polarity, opposite the first polarity, at the input of the electric converter, the braking device being arranged such that a quantity of electrical energy supplied during recharging to the first power supply capacitor, respectively to the second power supply capacitor increases as the voltage level of this first power supply capacitor, respectively of this second power supply capacitor lowers, the braking device is arranged such that the induced voltage signal has in each oscillation period of the mechanical oscillator, when the oscillation amplitude is included in the effective functioning range, at least one first interval wherein this induced voltage signal has the first polarity and at least one second interval wherein this induced voltage signal has the second polarity, the braking device is further arranged such that, for each oscillation of the mechanical transducer with an amplitude in the effective operating range, recharging of one of the first and second power supply capacitors, as applicable, takes place mostly generally in the two first half-vibrations and recharging of the other of these first and second power supply capacitors, as applicable, takes place mostly generally in the two second half-vibrations, the regulating device comprises a load pump arranged to be able to transfer on request electric loads from said one of the first and second power supply capacitors to said other, and the regulating device further comprises a logic circuit for controlling the load pump which receives as an input a measurement signal supplied by the measuring device and which is arranged so as to activate the load pump so that it transfers a first electric load from said one of the first and second power supply capacitors to said other when the time drift measured corresponds to said at least one certain gain.

The transfer of a first electric load is envisaged to increase, at least in an oscillation period following such a transfer, the recharging of said one of the first and second power supply capacitors and/or reduce the recharging of said other of these first and second power supply capacitors relative to the hypothetical case where the transfer of the first electric load would not take place. If during a first sequence of a regulation method according to the invention such a result is not obtained, this first sequence is repeated until the above-mentioned effect is obtained. A disequilibrium is introduced between the recharging of the first power supply capacitor and the recharging of the second power supply capacitor, in favor of said one of the first and second power supply capacitors, relative to a scenario arising in a stable non-correction phase, i.e. without time drift correction. In other words, the recharging of the first and second power supply capacitors is acted upon selectively to favor recharging thereof in the first half-vibrations of at least one oscillation and consequently momentarily decrease the instantaneous frequency of the mechanical oscillator. In a preferred alternative embodiment, the first and second power supply capacitors have substantially the same capacity value and are arranged to power the load jointly.

In a main embodiment of the invention, the regulating device is also arranged to be able to determine whether the time drift measured corresponds to at least one certain loss. The timepiece is then further characterized by the following specific features:

the load pump is also arranged to be able to transfer on request momentarily electric loads from said other of the first and second power supply capacitors to said one of these first and second power supply capacitors;

the logic circuit for controlling the load pump is arranged so as to activate the load pump so that it transfers a second electric load from said other of the first and second power supply capacitors to said one of these first and second power supply capacitors when the time drift measured corresponds to said at least one certain loss.

In the latter case, the transfer of a second electric load is envisaged to increase, at least in an oscillation period following such a transfer, the recharging of said other of the first and second power supply capacitors or/and reduce the recharging of said one of these first and second power supply capacitors relative to the hypothetical case where said transfer of this second electric load would not take place. Once again, if during a second sequence of a regulation method according to the invention such a result is not obtained, this second sequence is repeated until the above-mentioned effect is obtained. A disequilibrium is thus introduced between the recharging of the first power supply capacitor and the recharging of the second power supply capacitor, in favor of said other of the first and second power supply capacitors, relative to a scenario arising in a stable non-correction phase. In other words, the recharging of the first and second power supply capacitors is acted upon selectively to favor recharging thereof in the second half-vibrations of at least one oscillation and consequently momentarily increase the instantaneous frequency of the mechanical oscillator.

The load arranged at the output of the electric converter particularly comprises the regulating device which is powered by the first and second power supply capacitors arranged so as to deliver a power supply voltage corresponding to the sum of the respective voltages of these first and second power supply capacitors.

By means of the features of the timepiece movement according to the invention, it is possible to regulate, via an auxiliary oscillator comprising for example a quartz resonator, a mechanical oscillator that is very accurate moreover, whether it momentarily has a frequency that is slightly too high or too low. The regulation of the frequency consists of momentarily varying the instantaneous frequency of the mechanical oscillator such that the medium long-term frequency thereof is equal to that of the auxiliary oscillator. This regulation is very accurate and eliminates any time drift from the running of the mechanism in question.

In a preferred embodiment of the invention, the braking device, in particular the electromagnetic assembly of the electromechanical transducer, is arranged such that, in each oscillation period of the mechanical oscillator, a first lobe of the induced voltage signal exhibits a maximum positive voltage for this oscillation period and a second lobe of this induced voltage signal exhibits a maximum negative voltage for this oscillation period, and such that the first voltage lobe and the second voltage lobe occur, if said first polarity is positive while said second polarity is negative, respectively in a first half-vibration and a second half-vibration of one and/or the other of the two vibrations of the oscillation in question and, if said first polarity is negative while said second polarity is positive, respectively in a second half-vibration and a first half-vibration of one and/or the other of the two vibrations of this oscillation in question.

The term 'voltage lobe' is understood to mean a voltage pulse which is situated entirely above or entirely below a null value (defining a zero voltage), i.e. a voltage variation within a certain time interval with either a positive voltage wherein the positive value rises then falls again, or a negative voltage wherein the negative value falls than rises again.

In a general alternative embodiment, the electromagnetic assembly comprises at least one coil and a magnetized structure formed from at least one magnet and having at least one pair of magnetic poles, of opposite polarities, each generating a magnetic flux in the direction of a general plane of the coil, this pair of magnetic poles being arranged such that the respective magnetic fluxes thereof pass through the coil with a time-lag but with at least in part a simultaneity of the magnetic flux entering the coil and the magnetic flux leaving this coil, so as to form the first and second voltage lobes.

In one particular embodiment, the electromagnetic assembly of the timepiece comprises a first pair of bipolar magnets and a first coil as well as a second pair of bipolar magnets and a second coil, each pair of bipolar magnets having two respective magnetization axes with opposite polarities and a substantially identical angular opening, the median axis of the second pair of bipolar magnets and the second coil having an angular lag different to zero which is substantially identical to that provided between the first pair of bipolar magnets and the first coil. The electromagnetic assembly is arranged such that, when the resonator is resting, one of the first and second pairs of bipolar magnets is situated at an equal angular distance from the first and second coils, this electromagnetic assembly comprising either a plurality of coils arranged such that a first median axis between the first and second pairs of bipolar magnets defines an axis of symmetry for this plurality of coils, or a plurality of pairs of bipolar magnets arranged such that a second median axis between the first and second coils defines an axis of symmetry for this plurality of pairs of bipolar magnets. Finally, the various elements of the electromagnetic assembly are arranged such that the respective induced voltages in the coils in question are added together constructively.

In a first preferred alternative embodiment, the angular lag is substantially equal to 90°, the electromagnetic assembly comprising merely two coils, i.e. the first and second coils mentioned above which are out of step by an angle of 180°, and two pairs of bipolar magnets mounted on a balance of the mechanical resonator, i.e. the first and second pairs of magnets mentioned above also out of step by an angle of 180°.

In a second preferred alternative embodiment, there are envisaged the first and second coils mentioned above which are out of step by an angle of 120° and three pairs of bipolar magnets mounted on the balance of the mechanical resonator with angular lags of 120° therebetween (i.e. between one pair of magnets and each of the two other pairs of magnets). The two coils are advantageously arranged in a peripheral zone of the timepiece movement incorporating the mechanical oscillator which is conventionally positioned off center in this timepiece movement. It shall be noted that the three pairs of magnets arranged radially, at the same distance from the axis of rotation, on a pivoted balance not inducing weight disequilibrium, the center of inertia of these three pairs of identical magnets being positioned on the axis of rotation. This second alternative embodiment is advantageous.

In a third alternative embodiment, there is envisaged, in addition to the elements mentioned for the second alternative embodiment, a third coil also out of step by 120° relative to each of the two other coils. It shall be noted that this latter alternative embodiment is more bulky than the two preceding alternative embodiments and may give rise to design problems of the mechanical timepiece movement incorporating the mechanical oscillator.

BRIEF DESCRIPTION OF THE FIGURES

The invention will be described in more detail hereinafter using the appended drawings, given by way of examples that are in no way limiting, wherein:

FIG. 3 represents, for an electromagnetic assembly of a simplified electromagnetic transducer given in FIGS. 4A to 4C to explain the physical principles of the regulation occurring in the present invention, the induced voltage in the coil of this electromagnetic assembly when the balance-spring oscillates and the application of a first braking pulse in a certain vibration before the balance-spring passes via the neutral position thereof, as well as the angular velocity of the balance and the angular position thereof in a time interval wherein the first braking pulse occurs, FIG. 9 represents various electrical signals arising in the electrical diagram in FIG. 7.

DETAILED DESCRIPTION OF THE INVENTION

Figure 1:
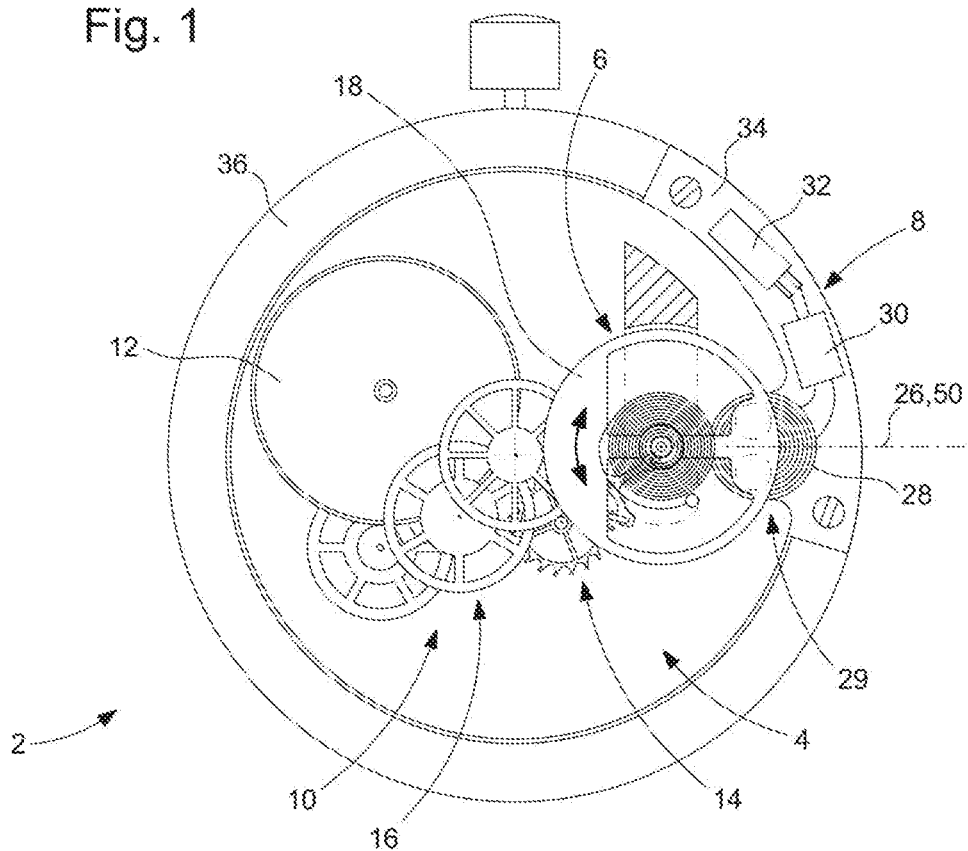
FIG. 1 is a general top view of a timepiece according to the invention.
Figure 2:
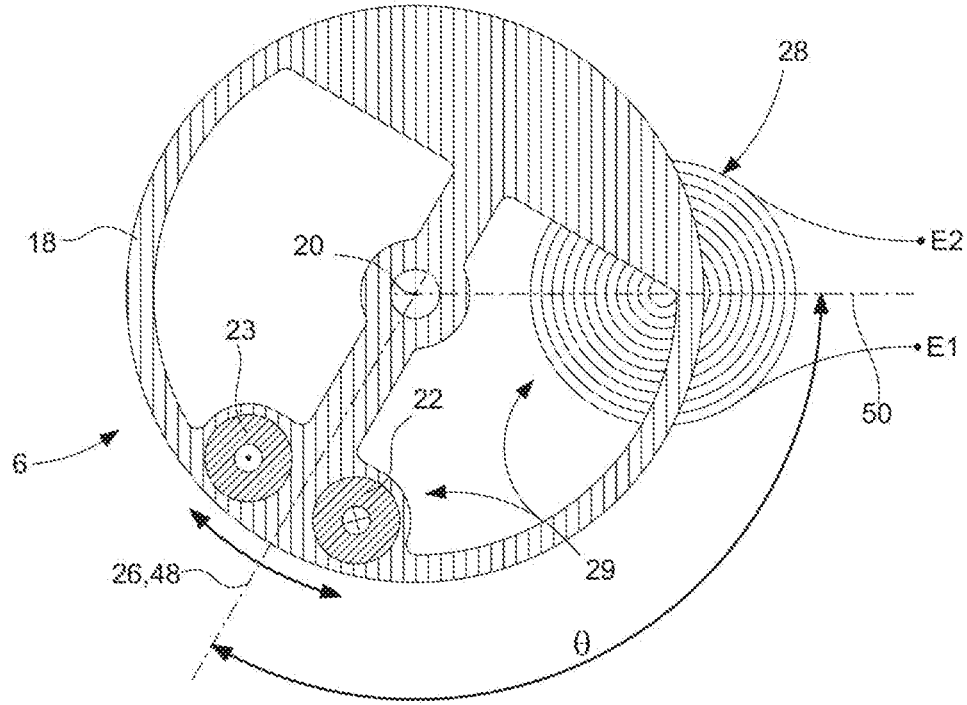
FIG. 2 is an enlarged partial view of the timepiece in FIG. 1, showing a first embodiment of an electromagnetic transducer forming a regulating system incorporated in this timepiece.

With reference to FIGS. 1 and 2, a timepiece according to the present invention will be described hereinafter. FIG. 1 is a partial plane view of a timepiece 2 comprising a mechanical movement 4, equipped with a mechanical resonator 6, and a regulation system 8. The maintenance means 10 of the mechanical resonator are conventional. They comprise a barrel 12 with a driving spring, an escapement 14 formed from an escapement wheel and a pallet assembly, as well as an intermediate geartrain 16 kinematically linking the barrel to the escapement wheel. The resonator 6 comprises a balance 18 and a standard balance-spring, the balance being pivotally mounted about an axis of rotation 20 between a plate and a bar. The mechanical resonator 6 and the maintenance means 10 (also referred to as excitation means) form a mechanical oscillator together. It shall be noted that, in general, in the definition of a mechanical timepiece oscillator, only the escapement is retained as maintenance means/excitation means of this mechanical oscillator, the energy source and an intermediate geartrain being considered separately. The balance-spring oscillates about the axis 20 when it receives mechanical pulses from the escapement wherein the escapement wheel is driven by the barrel. The geartrain 16 is part of a mechanism of the timepiece movement, the running speed whereof is set by the mechanical oscillator. This mechanism comprises, besides the geartrain 16, further wheels and analogue indicators (not shown) kinematically linked to this geartrain 16, the movement speed of these analogue indicators being set by the mechanical oscillator. Various mechanisms known to those skilled in the art may be envisaged, in particular time-related mechanisms.

FIG. 2 is a partial view of FIG. 1, along a horizontal cross-section at the level of the balance 18, showing two magnets 22, 23 and a coil 28 forming an electromagnetic assembly 29 according to the invention. The coil 28 is preferably of the wafer type (disc shape having a relatively small thickness). It is arranged on the plate of the timepiece movement and conventionally comprises two connection ends E1 and E2. As a general rule, there is envisaged an electromagnetic assembly which comprises at least one coil and a magnetized structure formed from at least one magnet and having at least one pair of magnetic poles, of opposite polarities, each generating a magnetic flux in the direction of a general plane of the coil, this pair of magnetic poles being arranged such that, when the mechanical resonator oscillates with an amplitude included in an effective functioning range, the respective magnetic fluxes thereof pass through the coil with a time-lag but with at least in part a simultaneity of the incoming magnetic flux and the outgoing magnetic flux, so as to form a central voltage lobe having a maximum peak value.

In the advantageous alternative embodiment in FIG. 2, the balance 18 bears, preferably in a zone situated in the vicinity of the outer diameter thereof defined by the felloe thereof, a pair of bipolar magnets having respective magnetization axes which are oriented axially with opposite polarities. The magnets are arranged close to one another, at a distance enabling an addition of the respective interactions thereof with the coil 28 in respect of the induced voltage therein (more specifically for the generation of the central voltage lobe mentioned above). In one alternative embodiment not shown, a single bipolar magnet may be arranged with the magnetization axis thereof parallel with the plane of the balance and oriented tangentially to a geometric circle centered on the axis of rotation 20. In the latter case, the induced voltage signal in the coil may have substantially the same profile as for the pair of magnets described above, but with a lesser amplitude given that only a portion of the magnetic flux of the magnet passes through the coil when the resonator oscillates. However, magnetic flux conducting elements may be associated with the single magnet to direct the magnetic flux thereof substantially in the direction of the general plane of the coil. It shall be noted that it is preferable to confine the magnetic flux of the magnet or magnets borne by the balance using a casing formed by parts of the balance, in particular by magnetic parts arranged on both sides of the magnets along the axial direction such that the coil is partially situated between these two magnetic parts.

The balance 18 defines a half-axis 26, from the axis of rotation 20 thereof and perpendicularly thereto, which passes in the middle of the pair of magnets 22 and 23. When the balance-spring is in the rest position thereof, the half-axis 26 defines a neutral position (angular rest position of the balance-spring corresponding to a zero angle) about which the balance-spring may oscillate at a certain frequency, particularly at a free frequency F0 corresponding to the oscillation frequency of the mechanical oscillator not subject to external force torques (other than those supplied periodically via the escapement). In FIG. 2, the mechanical resonator 6 (represented in the balance-spring thereof which is situated above the cutting plane) is represented in the neutral position thereof, corresponding to a minimum potential mechanical energy state of the resonator. It is noted that, in the neutral position, the half-axis 26 defines a reference half-axis 48 which is out of step with by an angle θ relative to the fixed half-axis 50 intercepting the axis of rotation 20 and the central axis of the coil 28. In other words, in projection in the general plane of the balance, the center of the coil 28 has an angular lag θ relative to the reference half-axis 48. In FIG. 2, this angular lag equals 120° in absolute values. Preferably, this angular lag θ is between 30° and 120° in absolute values.

Each oscillation of the mechanical resonator defines an oscillation period and it has a first vibration followed by a second vibration each between two extreme positions defining the oscillation amplitude of the mechanical resonator (note that the oscillating resonator and therefore the mechanical oscillator as a whole are considered herein, the oscillation amplitude of the balance-spring being defined inter alia by the maintenance means). Each vibration exhibits a passage of the mechanical resonator via the neutral position thereof at a median time and a certain duration between a start time and an end time which are defined respectively by the two extreme positions occupied by the mechanical resonator respectively at the start and at the end of this vibration. Each vibration consists of a first half-vibration ending at said median time and a second half-vibration starting at this median time.

The system 8 for regulating the frequency of the mechanical oscillator comprises an electronic circuit 30 and an auxiliary oscillator 32, this auxiliary oscillator comprising a clock circuit and for example a quartz resonator connected to this clock circuit. It shall be noted that, in one alternative embodiment, the auxiliary oscillator is integrated at least partially in the electronic circuit. The regulation system further comprises the electromagnetic assembly 29 described above, namely the coil 28 which is electrically connected to the electronic circuit 30 and the pair of bipolar magnets mounted on the balance. Advantageously, the various elements of the regulation system 8, with the exception of the pair of magnets, are arranged on a support 34 with which they form a mechanically independent module of the timepiece movement. Thus, this module may be assembled or associated with the mechanical movement 4 during the mounting thereof in a case. In particular, as represented in FIG. 1, the above-mentioned module is attached to a casing ring 36 surrounding the timepiece movement. It is understood that the regulation module may therefore be associated with the timepiece movement once the latter is entirely assembled and adjusted, the assembly and disassembly of this module being possible without having to work on the mechanical movement per se.

With reference to FIGS. 3 to 6C, the physical phenomenon whereon the regulation principle implemented in the timepiece according to the invention is based will firstly be described. A timepiece similar to that in FIG. 1, but not according to the present invention, is considered herein. This particular embodiment is therefore given herein merely to explain the physical phenomenon of interest. Note shall be taken of the following difference: The mechanical resonator 40, of which only the balance 42 has been represented in FIGS. 4A-4C and 6A-6C, bears a single bipolar magnet 44 the magnetization axis whereof is substantially parallel with the axis of rotation 20 of the balance, i.e. with an axial orientation. In this case, the half-axis in question 46 of the mechanical resonator 40 passes through the center of rotation 20 and the center of the magnet 44. In the example described, the angle θ between the reference half-axis 48 and the half-axis 50 has a value of approximately 90°. The two half-axes 48 and 50 are fixed relative to the timepiece movement, whereas the half-axis 46 oscillates with the balance and gives the angular position β of the magnet mounted on this balance relative to the reference half-axis, the latter defining the zero angular position for the mechanical resonator. More generally, the angular lag θ is such that an induced voltage signal generated in the coil on the passage of the magnet facing this coil is situated, upon a first vibration of any oscillation, prior to the passage of the medical half-axis by the reference half-axis (therefore in a first half-vibration) and, during a second vibration of any oscillation, after the passage of this median half-axis via the reference half-axis (therefore in a second half-vibration).

FIG. 3 shows four graphs. The first graph gives the voltage in the coil 28 over time when the resonator 40 oscillates, i.e. when the mechanical oscillator is activated. The second graph shows the time $t_{P1}$ at which a braking pulse is applied to the resonator 40 to make a correction in the running of the mechanism set by the mechanical oscillator. The time of the application of a rectangular-shaped pulse (i.e. a binary signal) is considered herein as the time position of the middle of this pulse. A variation in the oscillation period is observed during which the braking pulse and therefore an isolated variation of the frequency of the mechanical oscillator occur. In fact, as can be seen in the final two graphs of FIG. 3, respectively showing the angular velocity (values in radian per second: [rad/s]) and the angular position (values in radian: [rad]) of the balance over time, the time variation relates to the sole vibration during which the braking pulse occurs. It shall be noted that each oscillation has two successive vibrations which are defined in the present text as the two half-periods during which the balance respectively sustains an oscillation movement in one direction and subsequently an oscillation movement in the other direction. In other words, as previously explained, a vibration corresponds to a swing of the balance in one direction or the other between the two extreme positions thereof defining the oscillation amplitude.

The term braking pulse denotes an application, substantially during a limited time interval, of a certain force couple to the mechanical resonator braking same, i.e. a force torque opposing the oscillation movement of this mechanical resonator. As a general rule, the braking torque may be of various types, particularly magnetic, electrostatic or mechanical. In the embodiment described, the braking torque is obtained by the magnet-coil coupling and therefore it corresponds to a magnetic braking torque applied on the magnet 44 via the coil 28 which is controlled by a regulating device. Such braking pulses may for example be generated by short-circuiting the coil momentarily. This action can be detected in the graph of the coil voltage in the time zone during which the braking pulse is applied, this time zone being envisaged upon the appearance of an induced voltage pulse in the coil by the passage of the magnet. It is obviously in this time zone that the magnet-coil coupling enables contactless action via a magnetic torque on the magnet attached to the balance. Indeed, it is observed that the coil voltage falls towards zero during a short-circuit braking pulse (the induced voltage in the coil 28 by the magnet 44 being shown with lines in the above-mentioned time zone). Note that the short-circuit braking pulses represented in FIGS. 3 and 5 are mentioned herein within the scope of the explanations given, as the present invention envisages recovery of the braking energy to power the regulating device.

Figure 5:
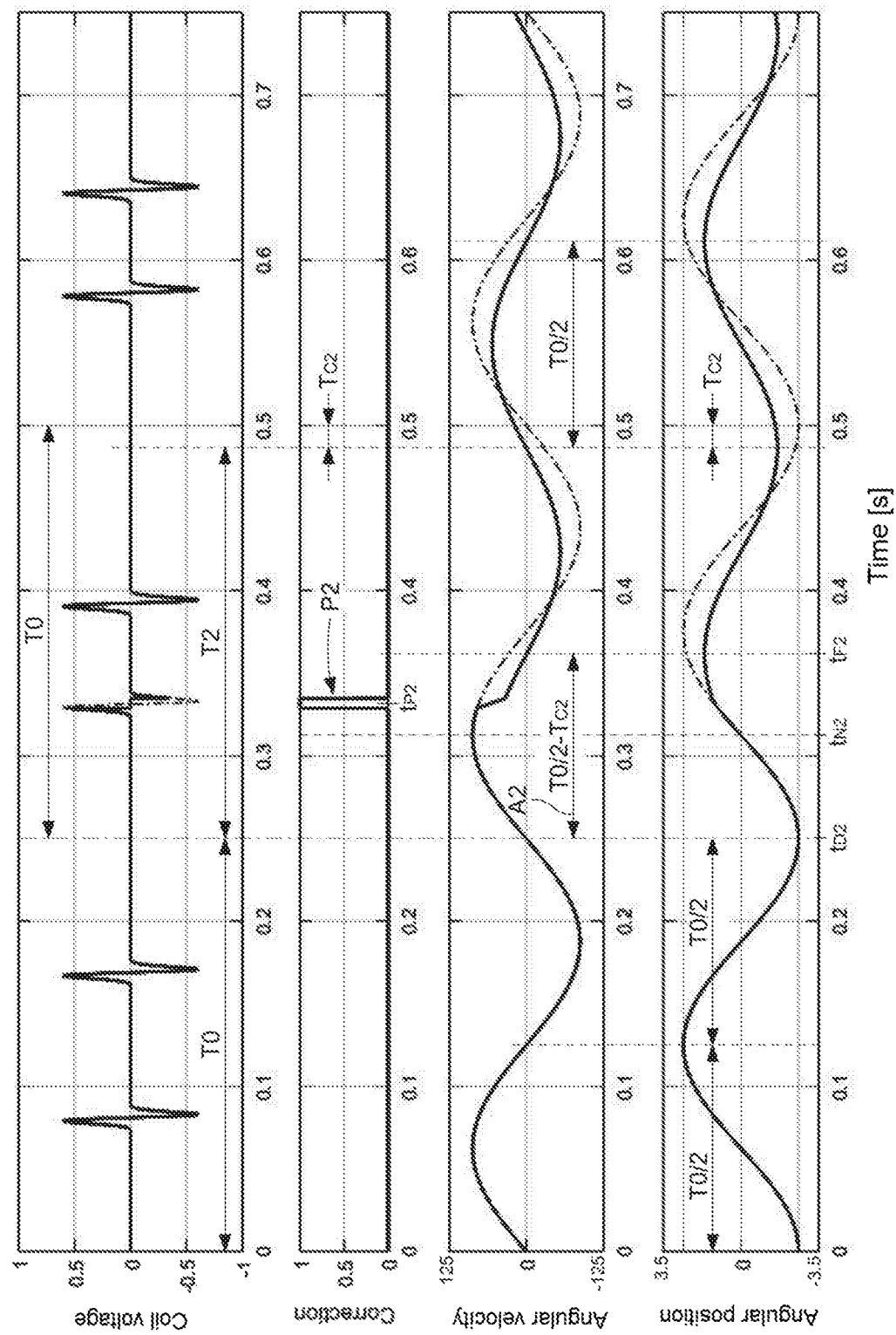
FIG. 5 is a figure similar to that in FIG. 3 with the application of a second braking pulse in a certain vibration after the balance-spring has passed via the neutral position thereof.

In FIGS. 3 and 5, the oscillation period T0 corresponds to a 'free' oscillation (i.e. without applying regulation pulses) of the mechanical oscillator. Each of the two vibrations of an oscillation period has a duration T0/2 without external disturbance or constraint (particularly by a regulation pulse). The time t=0 marks the start of a first vibration. It shall be noted that the 'free' frequency F0 of the mechanical oscillator is herein approximately equal to four Hertz (F0=4 Hz), such that the period T0=250 ms approximately.

Figure 4A:
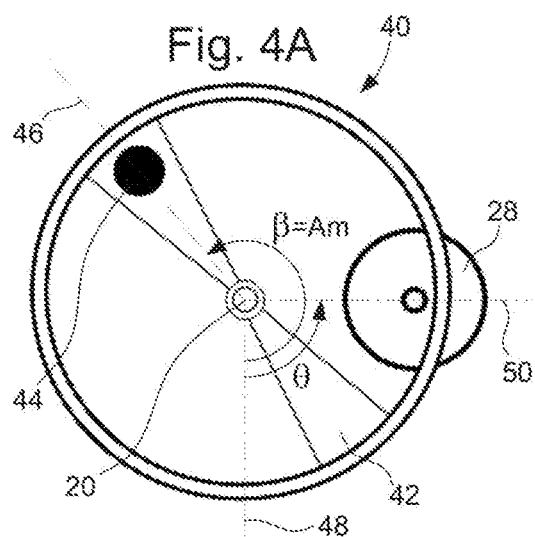
FIGS. 4A to 4C show, for the electromagnetic transducer in question in FIG. 3, the balance at three specific times of a vibration of the mechanical oscillator during which the first braking pulse is supplied.
Figure 4B:
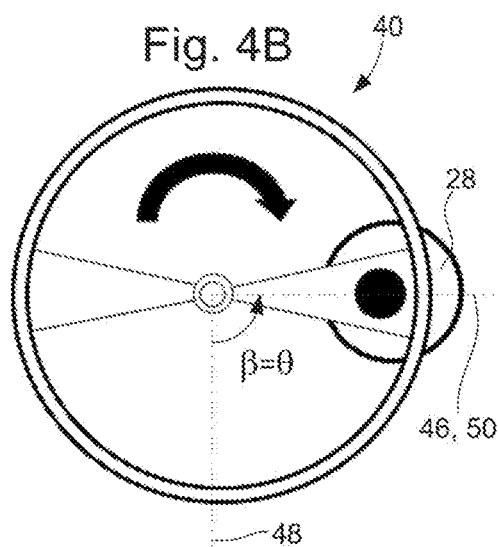
Figure 4C:
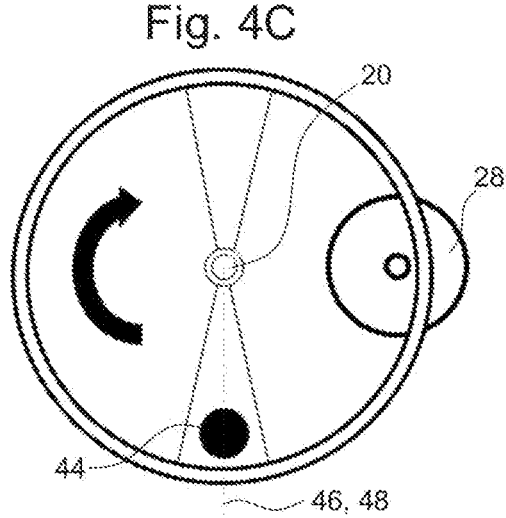

With reference to FIGS. 3 and 4A-4C, the behavior of the mechanical oscillator in a first scenario shall be described. After a first period T0 commences a new period T1, respectively a new vibration A1 during which a braking pulse P1 occurs. At the initial time $t_{D1}$ starts the vibration A1, the resonator 40 then being in the state in FIG. 4A where the magnet 44 occupies an angular position β corresponding to an extreme position (maximum positive angular position $A_m$). Then the braking pulse P1 occurs at the time $t_{P1}$ which is situated before the median time $t_{N1}$ at which the resonator passes via the neutral position thereof, FIGS. 4B, 4C representing the resonator at the two successive times $t_{P1}$ and $t_{N1}$ respectively. Finally, the vibration A1 ends at the end time $t_{F1}$.

In this first case, the braking pulse is generated between the start of a vibration and the passage of the resonator via the neutral position thereof, i.e. in a first half-vibration of this vibration. As envisaged, the angular velocity in absolute values decreases during the braking pulse P1. This induces a negative time-lag $T_{C1}$ in the oscillation period of the resonator, as shown by the two graphs of the angular velocity and of the angular position in FIG. 3, i.e. a loss relative to the non-disturbed theoretical signal (shown with broken lines). Thus, the duration of the vibration A1 is increased by a time interval $T_{C1}$. The oscillation period T1, comprising the vibration A1, is therefore extended relative to the value T0. This induces an isolated decrease in the frequency of the mechanical oscillator and a momentary slowing-down of the running of the associated mechanism.

Figure 6A:
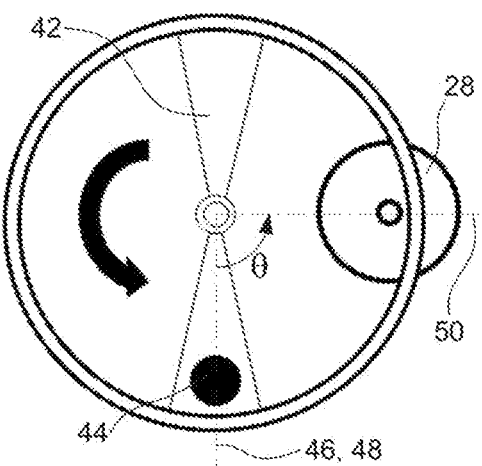
FIGS. 6A to 6C show the balance at three specific times of a vibration of the mechanical oscillator during which the second braking pulse is supplied.
Figure 6B:
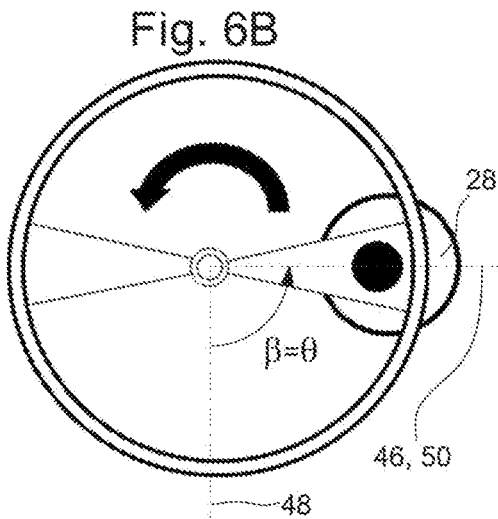
Figure 6C:
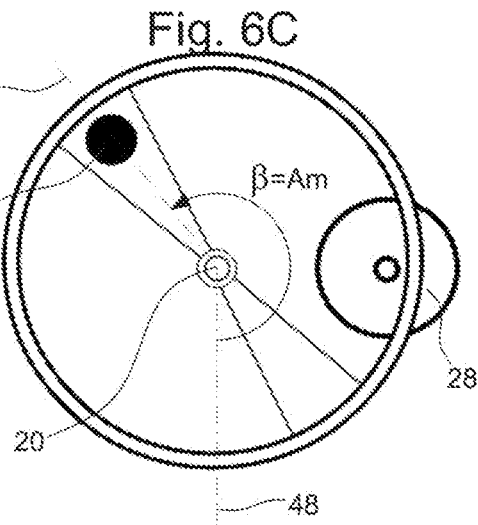

With reference to FIGS. 5 and 6A-6C, the performance of the mechanical oscillator in a second scenario shall be described. The graphs in FIG. 5 show the progression over time of the same variables as in FIG. 3. After a first period T0 commences a new period T2, respectively a vibration A2 during which a braking pulse P2 occurs. At the initial time $t_{D2}$ starts the vibration A2, the resonator 40 then being in an extreme position (maximum negative angular position not shown). After a quarter-period (T0/4) corresponding to a half-vibration, the resonator reaches the neutral position thereof at the median time $t_{N2}$ (configuration shown in FIG. 6A). Then the braking pulse P2 occurs at the time $t_{P2}$ which is situated after the median time $t_{N2}$ at which the resonator passes via the neutral position thereof in the vibration A2, i.e. in a second half-vibration of this vibration. Finally, this vibration ends at the end time $t_{F2}$ at which the resonator once again occupies an extreme position (maximum positive angular position). FIGS. 6B and 6C represent the resonator at the two successive times $t_{N2}$ and $t_{F2}$ respectively. It shall be noted in particular that the configuration in FIG. 6A is distinguished from the configuration in FIG. 4C by the opposite directions of the respective oscillation movements. Indeed, in FIG. 4C, the balance rotates in the clockwise direction when it passes via the neutral position in the vibration A1, whereas in FIG. 6A this balance rotates in the anti-clockwise direction upon passing via the neutral position in the vibration A2.

In the second scenario considered, the braking pulse is thus generated, in a vibration, between the median time at which the resonator passes via the neutral position thereof and the end time at which this vibration ends. As envisaged, the angular velocity in absolute values decreases during the braking pulse P2. Remarkably, the braking pulse induces herein a positive time-lag $T_{C2}$ in the oscillation period of the resonator, as shown by the two graphs of the angular velocity and of the angular position in FIG. 5, i.e. a gain relative to the non-disturbed theoretical signal (shown with broken lines). Thus, the duration of the vibration A2 is decreased by a time interval $T_{C2}$. The oscillation period T2, comprising the vibration A2, is therefore shorter than the value T0. Consequently, this induces an 'isolated' decrease in the frequency of the mechanical oscillator and a momentary acceleration of the running of the associated mechanism.

Figure 7:
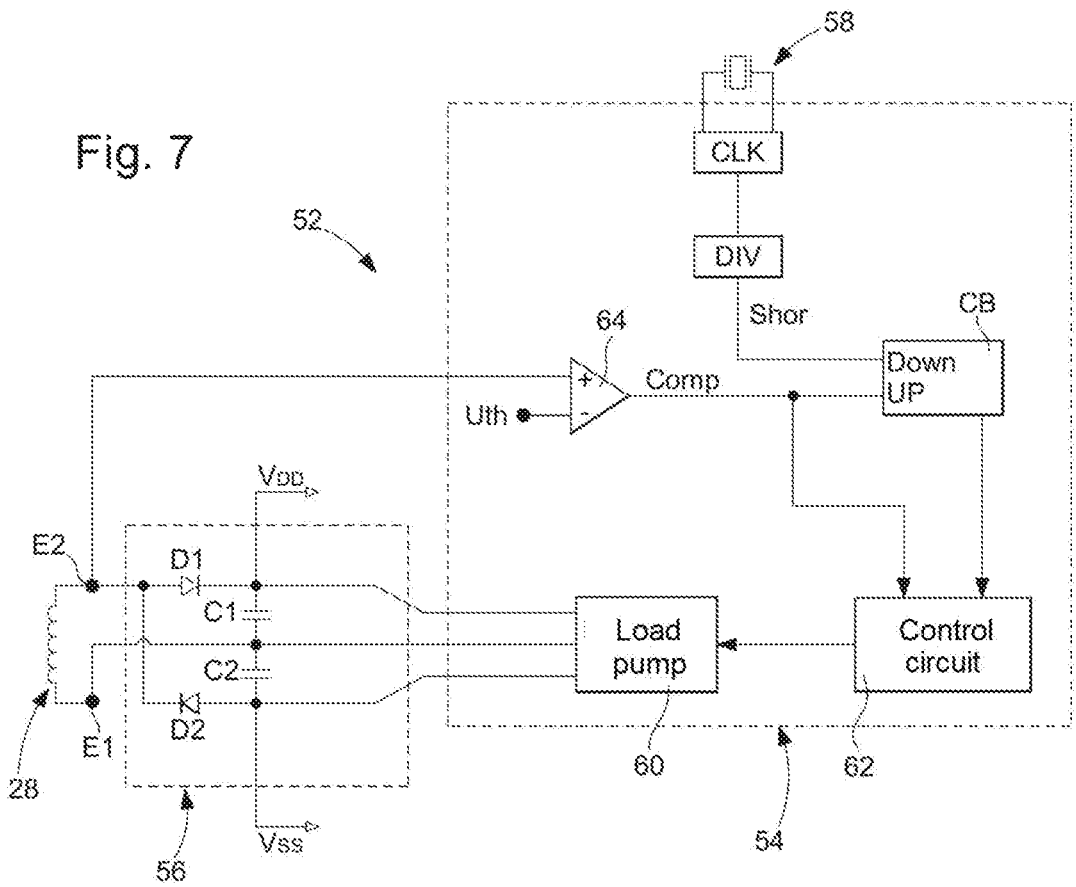
FIG. 7 shows the electrical diagram of an electric converter and a regulating device of the mechanical oscillator as arranged in the timepiece in FIG. 1.

With reference to FIGS. 1 and 2 described above and to FIGS. 7 to 13, a first embodiment of a timepiece according to the invention shall be described hereinafter. This timepiece 2 comprises:

a mechanism 12,16 (shown partially), a mechanical resonator 6 (balance-spring) suitable for oscillating about a neutral position corresponding to the minimal mechanical potential energy state thereof, each vibration of the successive oscillations having a passage of the mechanical resonator via the neutral position thereof at a median time and consisting of a first half-vibration between the start time thereof and the median time thereof and of a second half-vibration between the median time thereof and the end time thereof, a maintenance device 14 of the mechanical resonator forming with this mechanical resonator a mechanical oscillator which sets the running speed of the mechanism, an electromechanical transducer arranged to be able to convert mechanical power from the mechanical oscillator into electrical power, in particular when the mechanical oscillator 6 oscillates with an amplitude included in an effective functioning range, this electromagnetic transducer being formed by an electromagnetic assembly 29 comprising a coil 28 (only element of the electromagnetic assembly represented schematically in FIG. 7), mounted on the support (in particular the plate of the movement 4) of the mechanical resonator, and a pair of magnets 22, 23 mounted on the mechanical resonator, the electromagnetic assembly 29 being arranged so as to be able to supply an induced voltage signal $U_i(t)$ between the two output terminals E1 and E2 of the electromechanical transducer when the mechanical resonator oscillates with an amplitude included in the effective functioning range, the induced voltage signal being, during each oscillation of the mechanical resonator, positive in at least one first part of the corresponding oscillation period and negative in at least one second part of this oscillation period, an electric converter 56 arranged at the output of the electromechanical transducer so as to receive said induced electrical power, this electric converter comprising a power supply unit C1 & C2 arranged to be able to store electrical energy supplied by the electromechanical transducer, this electromechanical transducer and the electric converter forming a braking device of the mechanical resonator together, a device 52 for regulating the frequency of the mechanical oscillator, this regulating device comprising an auxiliary oscillator 58 & CLK and a measuring device arranged to be able to measure a potential time drift of the mechanical oscillator relative to the auxiliary oscillator, the regulating device being arranged to be able to determine whether the time drift measured corresponds to at least one certain gain or to at least one certain loss.

Preferably, the electromagnetic assembly 29 also partly forms the measuring device. This measuring device further comprises a bidirectional counter CB and a comparator 64 (of the Schmidt trigger type). The comparator receives at one input the induced voltage signal $U_i(t)$ and at the other input a threshold voltage signal $U_{th}$ the value whereof is positive in the example given. As in the first embodiment, the induced voltage signal $U_i(t)$ has for each oscillation of the resonator 6 a single positive lobe $LU_i$ which exceeds the value $U_{th}$, the comparator supplies as an output a signal 'Comp' having one pulse 70 per oscillation period, this signal being supplied, on one hand, to a first input 'UP' of the bidirectional counter CB and, on the other, to a logic control circuit 62. The bidirectional counter comprises a second input 'Down' which receives a clock signal $S_{hor}$ at a nominal frequency/set-point frequency for the oscillation frequency, this clock signal being derived from the auxiliary oscillator which supplies a digital reference signal defining a reference frequency. The auxiliary oscillator comprises a clock circuit CLK serving to excite the quartz resonator 58 and supply in return the reference signal which is composed of a succession of pulses corresponding respectively to the oscillation periods of the quartz resonator.

The clock signal supplies the reference signal thereof to a divider DIV which divides the number of pulses in this reference signal by the ratio between the nominal period of the mechanical oscillator and the nominal reference period of the auxiliary oscillator. The divider thus supplies a clock signal $S_{hor}$ defining a set-point frequency (for example 4 Hz) and presenting one pulse per set-point period (for example 250 ms) to the counter CB. Thus, the state of the counter CB determines the gain (if the number is positive) or the loss (if the number is negative) accumulated over time by the mechanical oscillator relative to the auxiliary oscillator with a resolution corresponding substantially to a set-point period. The state of the counter is supplied to a logic control circuit 62 which is arranged to determine whether this state corresponds to at least one certain gain (CB>N1, where N1 is a natural number) or to at least one certain loss (CB<–N2, where N2 is a natural number).

The electric converter 56 comprises a first circuit D1 & C1 for storing electrical energy which is arranged to be able to recharge a first power supply capacitor C1 of the power supply unit merely with a positive input voltage of the electric converter and a second circuit D2 & C2 for storing electrical energy which is arranged to be able to recharge a second power supply capacitor C2 of the power supply unit merely with a negative input voltage of the electric converter. During recharging, the quantity of electrical energy supplied by the braking device to the first power supply capacitor, respectively to the second power supply capacitor increases as the voltage level, in absolute values, of this first power supply capacitor, respectively of this second power supply capacitor lowers.

A load is connected or suitable for being regularly connected at the output of the electric converter 56 and powered by the power supply unit which supplies the power supply voltages $V_{DD}$ and $V_{SS}$, this load particularly comprising the regulation circuit 54 which is powered by the power supply unit. Preferably, the first and second power supply capacitors have substantially the same capacity value.

Figure 8:
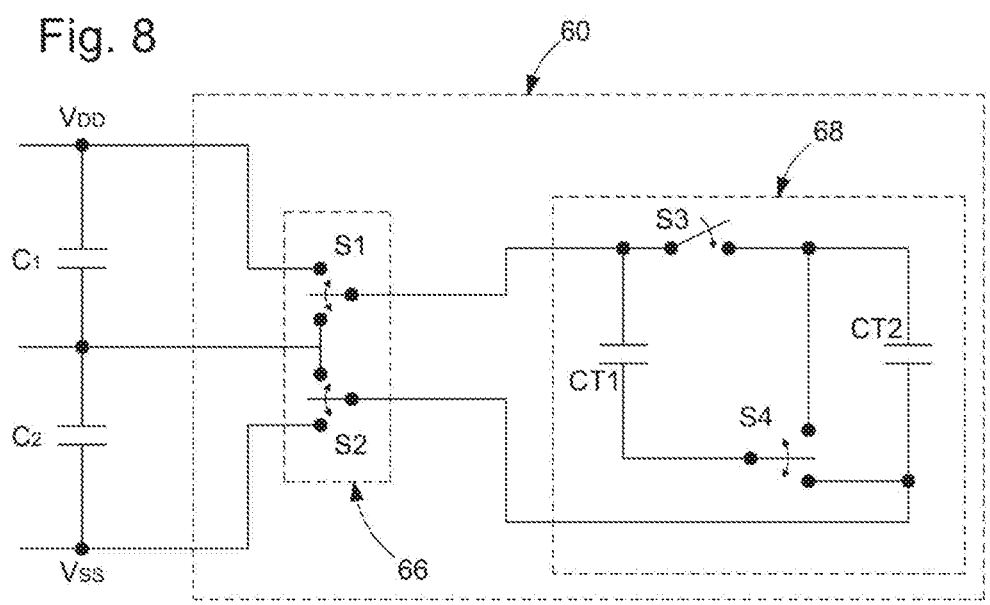
FIG. 8 shows the electronic circuit of a load pump forming the regulating device represented in FIG. 7.

The timepiece 2 is remarkable in that the regulation circuit 54 of the regulating device comprises a load pump 60 arranged to be able to transfer on request electric loads from the first power supply capacitor C1 to the second power supply capacitor C2 and vice versa. An alternative embodiment of such a load pump is represented in FIG. 8. This load pump comprises a multiplexer circuit 66, formed from two switches S1 and S2, and an electric load transfer circuit comprising a switch S3, a switch S4 and two switchable capacitors CT1 and CT2. The functioning of the load pump, well-known to those skilled in the art, shall not be described herein. The switch S3 and the switches S1, S2 and S4 are controlled by the logic control circuit 62 according to a regulation method (FIG. 10) according to the invention which shall be described hereinafter.

In a first general alternative embodiment, the braking device is arranged such that, for each vibration of the mechanical transducer in the effective functioning range, recharging of the power supply capacitor C2 occurs mostly generally in the first two half-vibrations $TM_1$-$TN_1$, $TM_3$-$TN_3$ and recharging of the power supply capacitor C1 occurs mostly generally in the two second half-vibrations $TN_0$-$TM_1$, $TN_2$-$TM_3$. In a second general alternative embodiment, the braking device is arranged such that, for each vibration of the mechanical transducer in the effective functioning range, recharging of the capacitor C1 occurs mostly generally in the first two half-vibrations $TM_1$-$TN_1$, $TM_3$-$TN_3$ and recharging of the capacitor C2 occurs mostly generally in the two second half-vibrations $TN_0$-$TM_1$, $TN_2$-$TM_3$. The logic control circuit 62 is arranged to control the load pump according to the first or second general alternative embodiment implemented, the transfer between the two power supply capacitors being inverted between the first and second general alternative embodiments for any time drift measured.

Figure 10:
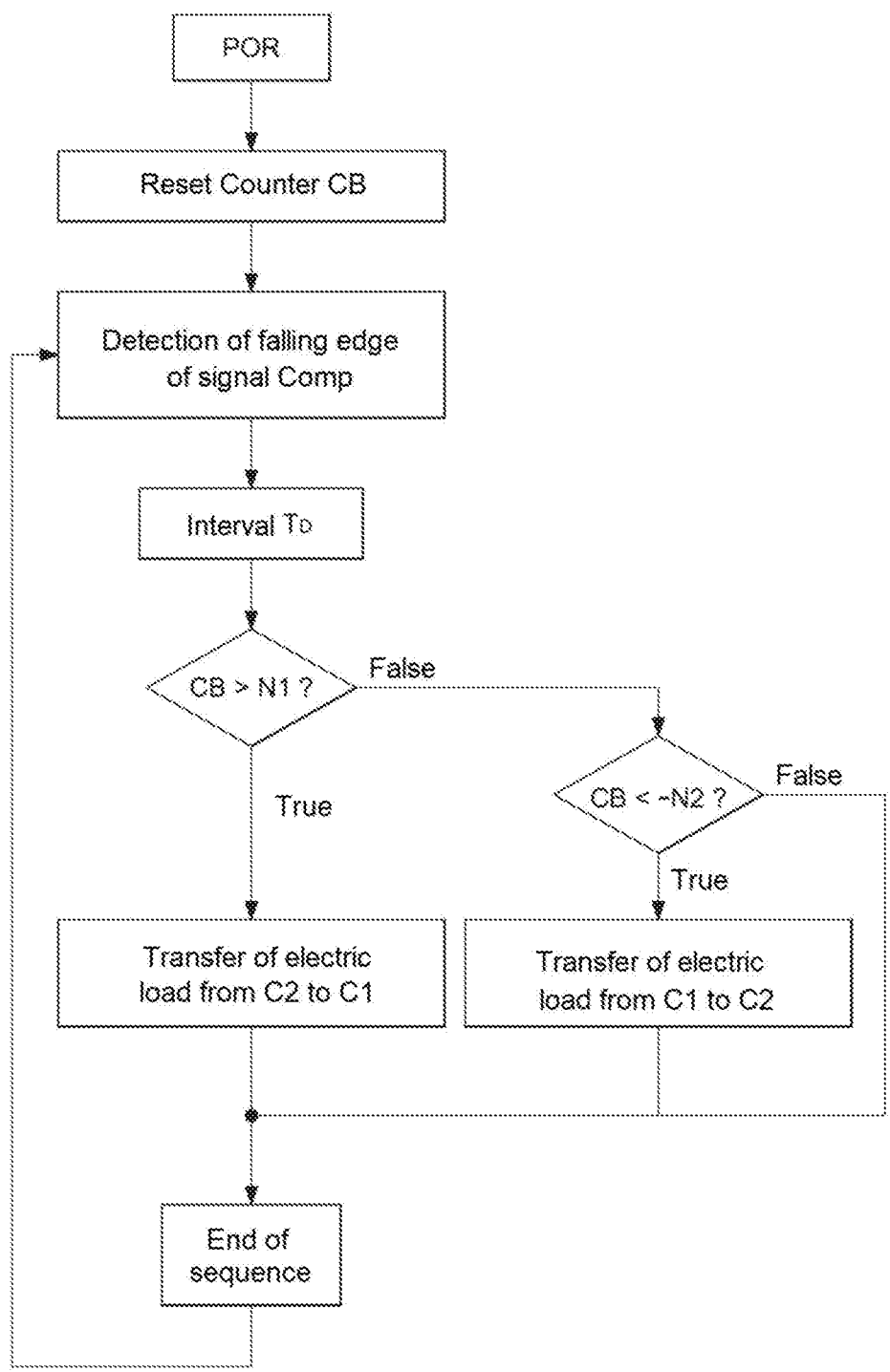
FIG. 10 is a flow chart of the method for regulating the running of the timepiece according to the invention.

Within the scope of the first general alternative embodiment which corresponds to the case of FIGS. 9 and 10, the logic control circuit 62 of the load pump is arranged so as to activate the load pump 60 so that it performs a transfer of a certain electric load from the second power supply capacitor C2 to the first power supply capacitor C1 when the time drift measured corresponds to at least one certain gain (CB>N1), so as to increase, at least in an oscillation period following such a transfer, the recharging of the second capacitor C2 (as represented in FIG. 9) relative to the hypothetical case where such a transfer of the certain electric load would not take place. Then, the logic control circuit 62 of the load pump is arranged so as to also activate the load pump 60 so that it performs a transfer of a certain electric load from the first power supply capacitor C1 to the second power supply capacitor C2 when the time drift measured corresponds to at least one certain loss (CB<–N2), so as to increase, at least in an oscillation period following such a transfer, the recharging of the first capacitor C1 relative to the hypothetical case where such a transfer of this certain electric load would not take place.

In FIG. 9 is represented, for the first general alternative embodiment, the scenario arising following the detection of a certain time drift corresponding to a gain in the running of the timepiece, i.e. at a frequency of the mechanical oscillator greater than the set-point frequency. The induced voltage signal Ui(t) corresponds to that generated by the electromagnetic assembly 29 described above with reference to FIG. 1. On the time axis [t] have been indicated the median times TNn, n=0, 1, 2, ..., corresponding to the successive passages of the mechanical resonator 6 via the neutral position thereof during oscillations in the effective functioning range, and the times TMn, n=0, 1, 2, ..., corresponding to the successive passages of the mechanical resonator alternately via the extreme positions thereof where the angular velocity thereof is zero and the direction of the swing thereof is inverted. The winding direction of the coil 28 and the polarities of the two magnets 22, 23 are envisaged such that, in each oscillation period of the mechanical oscillator, a first voltage lobe $LU_1$ of the induced voltage signal Ui (t) exhibits a maximum positive voltage $UM_1$ for this oscillation period and a second voltage lobe $LU_2$ of this induced voltage signal exhibits a maximum negative voltage $UM_2$ for this oscillation period.

In a first particular alternative embodiment, represented in FIG. 9, the first voltage lobe and the second voltage lobe occur respectively in a second half-vibration TNn-TMn, n=0, 1, 2, ..., of a vibration $A0_1$, $A1_1$ of each oscillation period and in a first half-vibration TMn-TNn, n=0, 1, 2, ..., of the other vibration $A0_2$, $A1_2$ of this oscillation period. In a second particular alternative embodiment, the second voltage lobe and the first voltage lobe occur respectively in a second half-vibration TNn-TMn, n=0, 1, 2, ..., of a vibration of each oscillation period and in a first half-vibration TMn-TNn, n=0, 1, 2, ..., of the other vibration of this oscillation period. It shall be noted that merely inverting the terminals E1 and E2 of the coil or, equivalently, the winding direction of the wire forming this coil induces a change of polarity for the induced voltage such that such an inversion makes it possible to switch from the first alternative embodiment to the second alternative embodiment and vice versa.

In the first embodiment, as already mentioned in part above, the electromagnetic assembly 29 comprises a pair of bipolar magnets, mounted on the balance and having magnetization axes with opposite respective polarities, and a coil rigidly connected to the support of the mechanical resonator. A median half-axis 26 starting from the axis of rotation 20 of the balance and passing via the midpoint of this pair of magnets defines a reference half-axis 48 when the resonator is resting and thus in the neutral position thereof. As seen in FIG. 9, the pair of magnets and the coil are arranged such that the induced voltage signal $U_i(t)$ generated at the terminals E1, E2 of the coil at the passage of the pair of magnets facing this coil has a central lobe $LU_1$, $LU_2$ with a maximum amplitude resulting from simultaneous coupling of the pair of magnets with the coil. Then, the coil 28 has at the center thereof an angular lag $\theta$ different to zero relative to the reference half-axis 48 to induce in each oscillation period of the mechanical resonator the first and second voltage lobes in respectively the second and first half-vibrations (case of FIG. 9) or in respectively the first and second half-vibrations, as disclosed above. The angular lag $\theta$ is advantageously between 30° and 120° in absolute values.

In FIG. 9 are also represented the positive voltage $V_{C1}$ at the upper terminal (defining $V_{DD}$) of the power supply capacitor C1 and the negative voltage $V_{C2}$ at the lower terminal (defining $V_{SS}$) of the power supply capacitor C2 (the zero voltage being considered as that of the end E1 of the coil). The power supply voltage $V_{AL}$ available is therefore given by $V_{C1}-V_{C2}$, i.e. the sum of the respective voltages of the first and second capacitors C1 and C2. Within the scope of the invention, a load is arranged at the output of the electric converter. It particularly comprises the regulation circuit which is powered by the first and second power supply capacitors delivering the power supply voltage $V_{AL}$. Thus, outside brief recharging periods of one and the other of the power supply capacitors, there is a certain progressive decrease (in absolute values) of the voltages $V_{C1}$ and $V_{C2}$ over time. The voltage lobes $LU_1$ and $LU_2$ which exhibit respectively the maximum positive induced voltage $UM_1$ and the maximum negative induced voltage $UM_2$ (in absolute values) serve to recharge the capacitors C1 and C2, respectively.

In the first period T0 during which no regulation event occurs, an induced current peak $I1_1$ recharges the capacitor C1 in a second half-vibration and an induced current peak $I1_2$ recharges the capacitor C2 in a first half-vibration. These induced current peaks correspond to electrical powers induced by the electromechanical transducer in the electromagnetic assembly 29 and absorbed by the electric converter 56. These electrical powers thus correspond to mechanical powers supplied by the mechanical oscillator. They are converted by the electric converter and consumed by the load associated therewith. Thus each induced current peak $IN_1$ and $IN_2$, N=1, 2, ..., supplied by the electromechanical transducer to the electric converter corresponds to a braking pulse and thus to a certain momentary braking torque applied to the mechanical oscillator. According to the physical phenomenon disclosed above with reference to FIGS. 3 to 6, the induced current peaks $IN_1$ induce a decrease in the duration of the vibrations during which they occur, and therefore an increase in the instantaneous frequency of the mechanical oscillator, whereas the induced current peaks $IN_2$ induce an increase in the duration of the vibrations during which they occur, and therefore a decrease in the instantaneous frequency of the mechanical oscillator.

In a period of functioning during which no regulation event and no particular performance resulting from such a regulation event occurs, i.e. in a period corresponding to normal functioning without regulation, therefore the scenario represented in the first oscillation period in FIG. 9 arises in respect of the voltages $V_{C1}$ and $V_{C2}$ and the recharging pulses of the capacitors C1 and C2 respectively by the induced currents $I1_1$ and $I1_2$, i.e. a poised scenario wherein a first electrical energy absorbed by the electric converter generally in the two first half-vibrations is substantially identical to a second electrical energy absorbed by the electric converter generally in the two second half-vibrations of each oscillation period. Thus, the positive time-lag which occurs generally in the two second half-vibrations is compensated by the negative time-lag which occurs generally in the two first half-vibrations of each oscillation period. In the particular case represented in FIG. 9, the positive time-lag which occurs in the first vibration $A0_1$ is compensated by the negative time-lag which occurs in the second vibration $A0_2$ of the corresponding oscillation period. It is understood therefore that, although the duration of the first vibration is different from that of the second vibration, the sum thereof is equal to a natural oscillation period T0 of the oscillator not subject to a regulation action.

During the first period T0, the logic control circuit has detected that the time drift measured by the measuring device corresponds to a certain gain in the running of the timepiece. It then carries out a regulation action consisting of transferring a certain electric load from the capacitor C2 to the capacitor C1. To do this, preferably, the regulating device comprises a circuit for detecting a predetermined event in the induced voltage signal and a timer circuit connected to the logic control circuit which is arranged to activate advantageously the load pump in time zones outside the appearance of the first and second lobes $LU_1$ and $LU_2$ of the induced voltage signal. To this end, the signal 'Comp' of the comparator 64 is supplied to the logic control circuit, said predetermined event being the appearance of a pulse 70 in this signal. At the falling edge of a pulse 70, the timer is activated and it then counts a predefined time interval $T_D$ then activates the load pump to transfer a certain electric load, which induces an increase AV in the voltage $V_{C1}$ and jointly a decrease DV of the voltage $V_{C2}$ (in absolute values). A disequilibrium is thus induced between the voltages $V_{C1}$ and $V_{C2}$, one $V_{C1}$ being charged to the detriment of the other $V_{C2}$ which is partially discharged. As the induced voltage pulses remain identical over time (in the absence of a decrease in oscillation amplitude or without anisochronism), the absolute difference between $V_{C1}$ and the maximum positive voltage $UM_1$ then reduces the absolute difference between $V_{C2}$ and the maximum negative voltage $UM_2$ increases, the absolute value of $V_{C2}$ decreasing. Consequently, during the generation of the voltage lobe $LU_1$ in the vibration $A1_1$, the induced current $I2_1$ is relatively low, or even zero, whereas during the generation of the voltage lobe $LU_2$ in the vibration $A1_2$, the induced current $I2_2$ is relatively high, as can be seen in the graph at the bottom of FIG. 9.

By reducing the electrical energy extracted by the electric converter during the vibration $A1_1$, the braking of the oscillator in the second half-vibrations is reduced relative to the preceding period T0, which corresponds to a reduction in the positive time-lag. Furthermore, by increasing the electrical energy extracted by the electric converter during the vibration $A1_2$, the braking of the oscillator in the first half-vibrations is increased relative to the preceding period T0, which corresponds to an increase in the negative time-lag. These two variations therefore have a consistent effect. Thus, generally, relative to the preceding period, the electric load transfer has induced a negative time-lag and therefore an increase in the duration of the oscillation period following this transfer. A reduction in the instantaneous frequency of the oscillator is obtained, which makes it possible to correct at least partially the certain gain detected having led to this regulation action. The flow chart in FIG. 10 summarizes the regulation method implemented in the logic control circuit. In a similar manner to that described above, when the logic control circuit detects that the time drift measured by the measuring device corresponds to a certain loss in the running of the timepiece, it then carries out a regulation action consisting of transferring a certain electric load from the capacitor C1 to the capacitor C2. The effect is the reverse, namely that, relative to the preceding period, the electric load transfer generally induces a positive time-lag and therefore a reduction in the duration of the oscillation period following this transfer. An increase in the instantaneous frequency of the oscillator making it possible to correct the loss detected at least partially is thus obtained.

Figure 11:
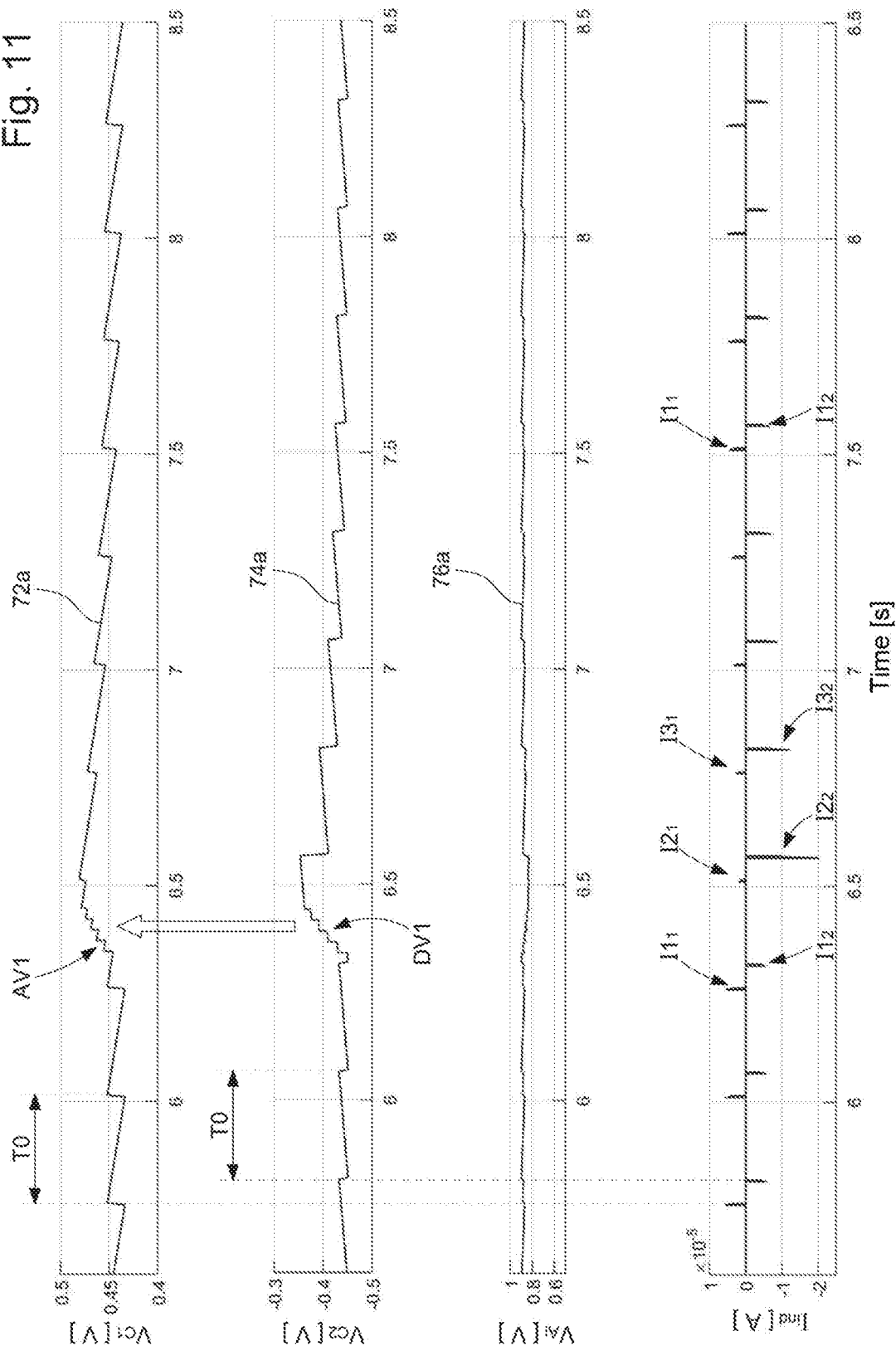
FIG. 11 represents the voltage signals at the terminals of the two power supply capacitors of the electric converter in FIG. 7, the resulting power supply voltage and the induced current pulses at the terminals of the coil of the electromagnetic transducer for a first alternative embodiment of load pump control.

FIG. 11 shows a simulation of the functioning of an alternative embodiment of the first embodiment wherein the arrangement of the load pump enables a limited electric load transfer per cycle, such that the load pump is controlled so as to perform a rapid succession of a plurality of electric load transfer cycles when a certain time drift has been detected. In the particular example in FIG. 11, a step increase AV1 in the voltage $V_{C1}$, respectively a corresponding decrease DV1 in the voltage $V_{C2}$ are induced over a duration less than a vibration. The curves 72a and 74a give the progression of the voltages $V_{C1}$ and $V_{C2}$. The curve 76a gives the power supply voltage, which remains substantially stable. The graph at the bottom of FIG. 11 shows the induced current $I_{ind}$ which exhibits, as explained above, a succession of pulses $IN_1$ and $IN_2$, N=1, 2, . . . . More specifically, outside the regulation period, there are alternately pulses $I1_1$ and $I1_2$ as previously described. Following the electric load transfer (AV1, DV1), in the oscillation period directly following such a transfer, the pulses $I2_1$ and $I2_2$ as previously described are obtained. Finally, a transition period (for example of a duration of three oscillation periods, as in the graph in question) is observed, during which a further disequilibrium occurs in the recharging of the capacitors C1 and C2, as seen with the pulses $I3_1$ and $I3_2$, and therefore an additional certain time-lag associated with the electric load transfer.

Figure 12:
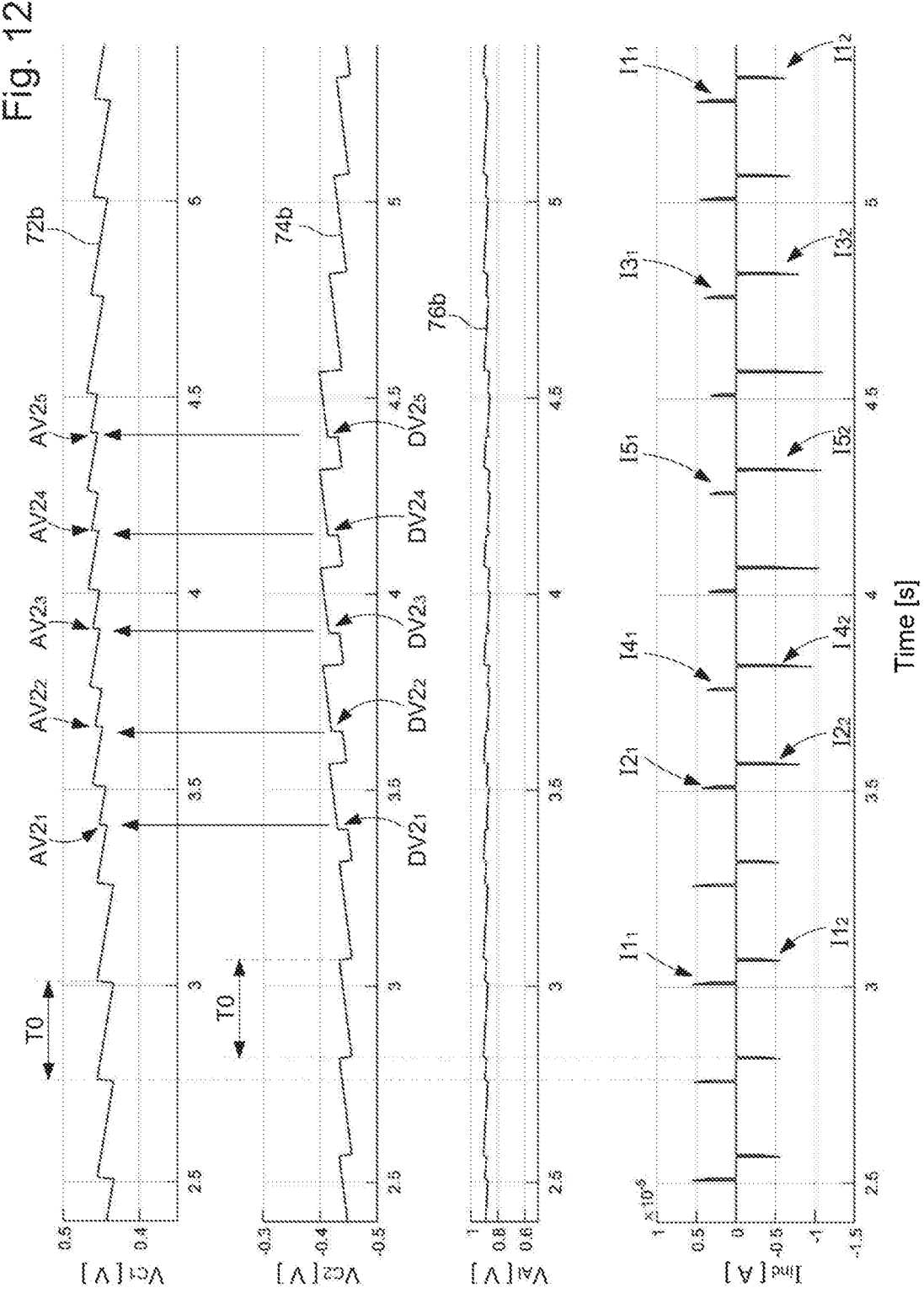
FIG. 12 is similar to FIG. 11, but for a second alternative embodiment of load pump control.

In the alternative embodiment in FIG. 12, representing the same physical quantities as FIG. 11, the logic control circuit is arranged such that, when the time drift measured corresponds to at least one certain gain, a plurality of separate transfers (corresponding to the voltage variations $AV2_m$ and $DV2_m$, m=1, 2, 3, . . . , respectively for the voltages $V_{C1}$, graph 72b, and $V_{C2}$, graph 74b) of first electric loads from the capacitor C2 to the capacitor C1 are performed during a plurality of respective oscillations of the mechanical oscillator. It is then observed in the regulation period, following the first pair of pulses $I2_1$ and $I2_2$ previously described, a first transition period with pairs of pulses $I4_1$ and $I4_2$ having crest/peak values which progressively increase the difference between the two pulses before a stationary state/a stationary period occurs with pairs of pulses $I5_1$ and $I5_2$ exhibiting the greatest ratio between the crest/peak values. Once again, it can be observed that the power supply voltage $V_{AL}$, graph 76b, is substantially stable.

In a more complex regulation method, it is possible to envisage varying, according to the time drift measured, the number of oscillation periods during which a certain electric load transfer is performed. Thus, as soon as a first drift is observed, an electric load transfer is performed during a sequence of the regulation method in a single oscillation period, whereas as soon as a second time drift greater than the first drift is observed, a plurality of electric load transfers are performed in a plurality of respective oscillation periods during a sequence of the regulation method. Obviously, a plurality of predetermined values for the time drift may be stored in memory in the regulation circuit and the number of transfer cycles of a certain electric load by the load pump is envisaged according to which predetermined value is detected.

Figure 13:
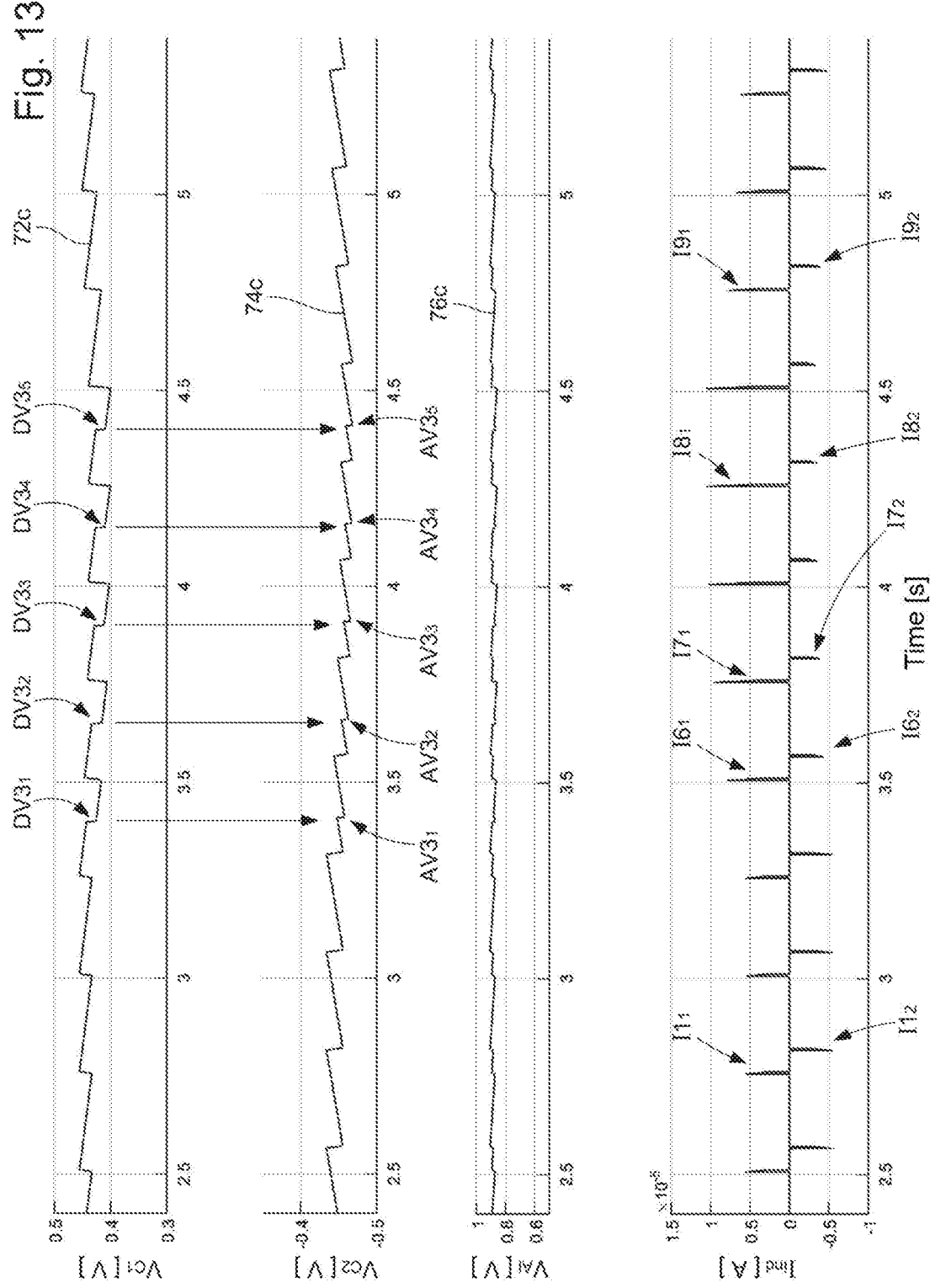
FIG. 13 is similar to FIG. 11, but for a third alternative embodiment of load pump control.
Figure 14:
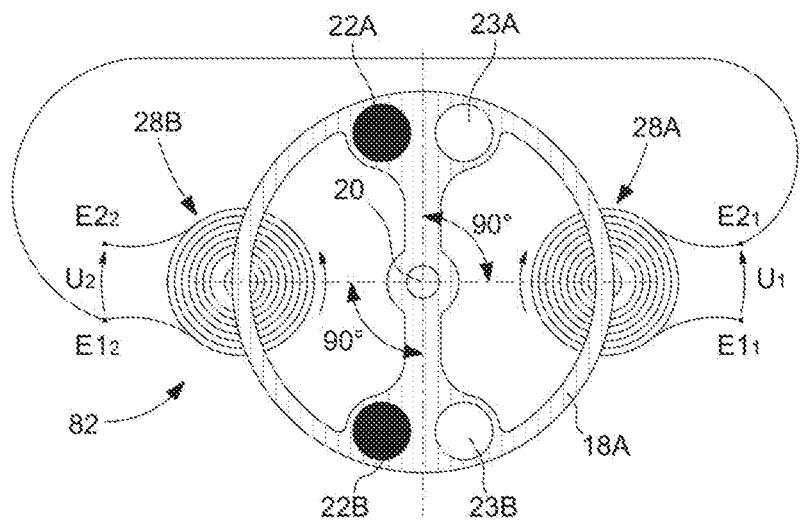
FIG. 14 shows a second embodiment of an electromechanical transducer incorporated in a timepiece according to the invention.

FIG. 13 shows, for the same regulation method as shown in FIG. 12 and thus the same timepiece, the scenario where the regulation circuit detects at least one certain loss in the running of the timepiece. In this case, so as to induce a positive time-lag, the electric load transfers are performed successively from the capacitor C1 to the capacitor C2. A voluntary positive time-lag and therefore a reduction in the duration of some oscillation periods following this transfer are thus induced. An increase in the instantaneous frequency of the oscillator is then obtained, which makes it possible to correct at least partially the certain loss detected having led to this regulation action. More specifically, the logic control circuit is arranged such that, when the time drift measured corresponds to at least one certain loss, a plurality of separate transfers (corresponding to the voltage variations $AV3_m$ and $DV3_m$, m=1, 2, 3, . . . , respectively for the voltages $V_{C2}$, graph 74c, and $V_{C1}$, graph 72c) of second electric loads from the capacitor C1 to the capacitor C2 are performed during a plurality of respective oscillations of the mechanical oscillator. As expected, the graph 76c of the power supply voltage $V_{AL}$ shows that it is substantially stable. The pairs of pulses $I6_1$ and $I6_2$, $I7_1$ and $I7_2$, $I8_1$ and $I8_2$, $I9_1$ and $I9_2$ of the induced current $I_{ind}$ in the regulation period exhibit at the level of the crest/peak values thereof an inversion, in absolute values, relative to the corresponding pairs of FIG. 12 (respectively to the pairs of pulses $I2_1$ and $I2_2$, $I4_1$ and $I4_2$, $I5_1$ and $I5_2$, $I3_1$ and $I3_2$).

In order to increase the induced voltage and thus the power supply voltage, it is envisaged in a second embodiment to provide an electromagnetic assembly with two coils arranged on the support of the balance-spring and two pairs of bipolar magnets mounted on the balance, each pair of magnets having a configuration as represented in FIGS. 1 and 2. Advantageously, the second pair of magnets has an angular opening substantially identical to that of the first pair of magnets. Furthermore, the second coil and the second pair of magnets have therebetween a second angular lag substantially identical to the first angular lag between the first coil and the first pair of magnets. The winding direction of the first and second coils and the connection therebetween and/or to the converter are envisaged such that the two respective induced voltages in the first and second coils are added together.

The second embodiment essentially differs from the first embodiment by the arrangement of the electromagnetic assembly forming the electromechanical transducer. With reference to FIGS. 14 and 15A-15C, a specific alternative embodiment of the second embodiment of a timepiece according to the invention shall be described hereinafter. The electric converter, the regulation circuit and the regulation method being similar to those of the first embodiment, they shall not be described herein. The electromagnetic assembly of the electromechanical transducer 82 is specific firstly in that the first and second angular lags each have substantially a value equal to 90°. Then, the first and second pairs of bipolar magnets 22A,23A, 22B,23B exhibit therebetween a planar symmetry with by way of plane of symmetry a geometric plane comprising the axis of rotation 20 of the mechanical resonator and a geometric axis passing via the centers of the two coils. Finally, the first and second coils 28A, 28B have reverse winding directions in projection in the general median plane, these first and second coils being aligned on a line passing via the center of rotation 20 and being connected (respective ends $E2_1$ and $E1_2$) such that the respective induced voltages thereof are added together at the two output terminals $E1_1$ and $E2_2$ of the electromechanical transducer.

Figure 15A:
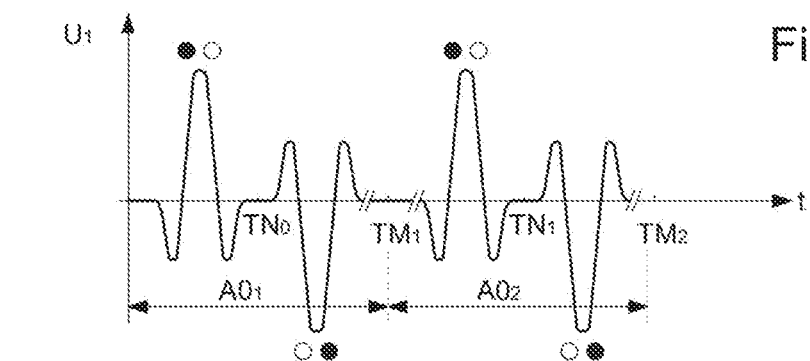
FIGS. 15A to 15C represent various induced voltage signals supplied by the electromechanical transducer in FIG. 14.
Figure 15B:
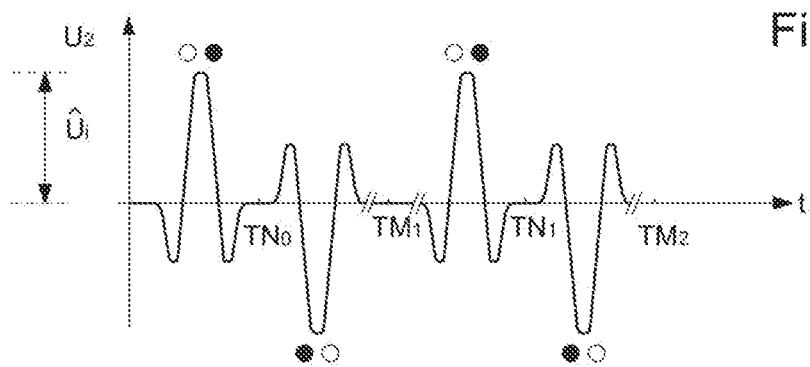
Figure 15C:
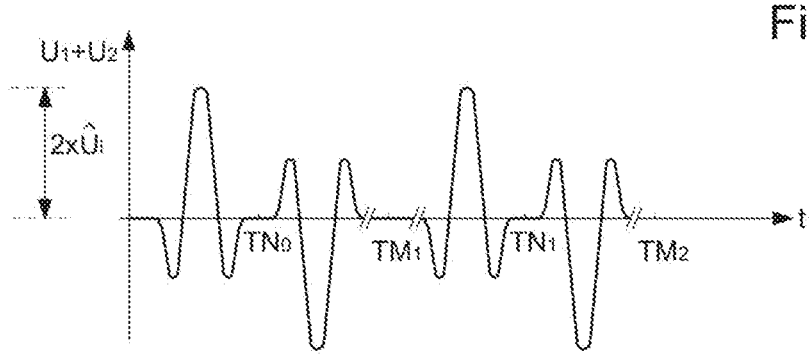

As shown in FIGS. 15A to 15C, this specific configuration makes it possible not only to increase the induced voltage supplied to the electric converter, but also to double the first and second induced voltage lobes exhibiting respectively a maximum positive voltage and a maximum negative voltage. Above each voltage lobe is represented a pair of magnets with the direction of the successive appearance of the two magnets thereof facing the coil in question. By means of the specific electromagnetic assembly, two positive voltage lobes are obtained respectively in the first respective first half-vibrations of the two vibrations $A0_1$ and $A0_2$ of an oscillation period of the mechanical resonator, as well as two negative voltage lobes respectively in the respective second half-vibrations of the two vibrations $A0_1$ and $A0_2$. The induced voltage signals $U_1$ and $U_2$ supplied by the coils 28A and 28B are added together, as shown in FIG. 15C, resulting in a doubling of the peak voltage Ûi. Thus, each induced voltage lobe (FIGS. 15A and 15B) contributes to the recharging of the two capacitors of the electric converter and to the power supply of the load associated therewith. This results in a regulation of the running of the timepiece which may occur in the two vibrations of one or a plurality of oscillation period(s) following electric load transfers between the two capacitors. Note that the comparator of the measuring device generates two pulses per oscillation period, one out of two pulses being supplied to the bidirectional counter.

The invention claimed is:
1. A timepiece, comprising:
a mechanism,
a mechanical resonator suitable for oscillating about a neutral position corresponding to the minimal mechanical potential energy state thereof, each oscillation of the mechanical resonator defining an oscillation period and having two successive alternations each between two extreme positions which define the oscillation amplitude of the mechanical resonator, each alternation having a passage of the mechanical resonator via the neutral position thereof at a median time and consisting of a first half-alternation between an initial time of said alternation and the median time thereof and a second half-alternation between said median time and an end time of said alternation,
a maintenance device of the mechanical resonator forming with said mechanical oscillator a mechanical oscillator which defines the running speed of said mechanism,
an electromechanical transducer arranged to be able to convert mechanical power from the mechanical oscillator into electrical power when the mechanical resonator oscillates with an amplitude in an effective functioning range, said electromechanical transducer being formed by an electromagnetic assembly comprising at least one coil, mounted on a mechanical assembly consisting of the mechanical resonator and a support thereof, and at least one magnet mounted on the mechanical assembly, the electromagnetic assembly being arranged so as to be able to supply an induced voltage signal between two output terminals of the electromechanical transducer when the mechanical resonator oscillates with an amplitude in said effective functioning range,
an electric converter connected to the two output terminals of the electromechanical transducer so as to be able to receive an induced electric current from said electromechanical transducer, said electric converter comprising a power supply unit arranged to be able to store the electrical energy supplied by the electromechanical transducer, said electromechanical transducer and the electric converter forming a braking device of the mechanical resonator together,
a load connected or suitable for being regularly connected to the electric converter so as to be able to be powered by the power supply unit,
a regulating device for regulating the frequency of the mechanical oscillator, said regulating device comprising an auxiliary oscillator and a measuring device arranged to be able to detect a potential time drift of the mechanical oscillator relative to the auxiliary oscillator, the regulating device being arranged to be able to determine whether the time drift measured corresponds to at least one certain gain;
wherein the power supply unit comprises a first power supply capacitor and a second power supply capacitor, both arranged to be able to power said load, and the electric converter is formed by a first electrical energy storage circuit, which comprises the first power supply capacitor and which is arranged to be able to recharge said first power supply capacitor merely with a voltage having a first polarity at the input of the electric converter, and by a second electrical energy storage circuit which comprises the second power supply capacitor and which is arranged to be able to recharge said second power supply capacitor merely with a voltage having a second polarity, opposite the first polarity, at the input of the electric converter, the braking device being arranged such that a quantity of electrical energy supplied during recharging to the first power supply capacitor, respectively to the second power supply capacitor increases as the voltage level of said first power supply capacitor, respectively of said second power supply capacitor lowers; wherein the braking device is arranged such that said induced voltage signal has in each oscillation period of the mechanical oscillator, when said oscillation amplitude is included in the effective functioning range, at least one first interval, situated in the two first half-alternations, wherein said induced voltage signal has said first polarity and at least one second interval, situated in the two second half-alternations, wherein said induced voltage signal has said second polarity, the braking device being further arranged such that, for each oscillation of the mechanical transducer with an amplitude in said effective functioning range, recharging of the first power supply capacitor, as applicable, takes place mostly generally in the two first half-alternations and recharging of the second power supply capacitor, as applicable, takes place mostly generally in the two second half-alternations;

wherein the regulating device comprises a load pump arranged to be able to transfer on request electric loads from the first power supply capacitor to the second power supply capacitor; and wherein the regulating device further comprises a logic circuit for controlling the load pump which receives as an input a measurement signal supplied by the measuring device and which is arranged so as to activate the load pump so that the logic control circuit transfers a first electric load from the first power supply capacitor to second power supply capacitor when the time drift measured corresponds to said at least one certain gain.

2. The timepiece according to claim 1, wherein the logic control circuit is arranged so as to be able to perform, when the time drift measured corresponds to said at least one certain gain or to at least one gain greater than the at least one certain gain, a plurality of transfers of a plurality of first electric loads from the first power supply capacitor to the second power supply capacitor during a plurality of oscillations of the mechanical resonator.

3. The timepiece according to claim 1, wherein the regulating device is also arranged to be able to determine whether the time drift measured corresponds to at least one certain loss; wherein said load pump is also arranged to be able to transfer on request momentarily electric loads from said second power supply capacitor to said first power supply capacitor; and wherein the logic control circuit of the load pump is arranged so as to activate the load pump is arranged so as to activate the load pump so that the logic control circuit performs a transfer of a second electric load from the second power supply capacitor to the first power supply capacitor when the time drift measured corresponds to said at least one certain loss.

4. The timepiece according to claim 3, wherein the logic control circuit is arranged so as to be able to perform, when the time drift measured corresponds to said at least one certain loss or to at least one loss greater than the at least one certain loss, a plurality of transfers of second electric loads from the second power supply capacitor to the first power supply capacitor during a plurality of oscillations of the mechanical resonator.

5. The timepiece according to claim 1, wherein the first and second power supply capacitors have substantially the same capacity value and are arranged to power said load jointly.

6. The timepiece according to claim 1, wherein said load arranged at the output of the electric converter particularly comprises said regulating device which is powered by the first and second power supply capacitors arranged so as to deliver a power supply voltage corresponding to the sum of the respective voltages of said first and second power supply capacitors.

7. The timepiece according to claim 6, wherein the braking device is arranged such that, in each oscillation period of the mechanical oscillator when said oscillation period of the mechanical resonator is in said effective functioning range, a first lobe of the induced voltage signal exhibits a maximum positive voltage for the oscillation period in question and a second lobe of said induced voltage signal exhibits a maximum negative voltage for said oscillation period, and such that the first voltage lobe and the second voltage lobe occur, if said first polarity is positive while said second polarity is negative, respectively in a first half-alternation and a second half-alternation of one and/or the other of the two alternations of the oscillation in question, and, if said first polarity is negative while said second polarity is positive, respectively in a second half-alternation and a first half-alternation of one and/or the other of the two alternations of said oscillation in question.

8. The timepiece according to claim 7, wherein the electromagnetic assembly comprises a magnetized structure formed from at least one magnet and having at least one pair of magnetic poles, of opposite respective polarities, each generating a magnetic flux in the direction of a general plane of said at least one coil, said pair of magnetic poles being arranged such that the respective magnetic fluxes thereof pass through the at least one coil with a time-lag but with at least in part a simultaneity of the incoming magnetic flux and the outgoing magnetic flux, so as to form said first and second voltage lobes.

9. The timepiece according to claim 8, wherein the electromagnetic assembly comprises a pair of bipolar magnets mounted on a balance of the mechanical resonator and having respective magnetization axes with opposite polarities, said pair of bipolar magnets defining said pair of magnetic poles, said at least one coil being rigidly connected to a support of the mechanical resonator, a median half-axis starting from the axis of rotation of the balance and passing via the midpoint of said pair of magnets defining a reference half-axis when the resonator is resting and thus in the neutral position thereof, the pair of magnets and the at least one coil being arranged such that an induced voltage pulse generated between the two ends of the at least one coil at the passage of the pair of magnets facing said at least one coil exhibits a central lobe with a maximum amplitude resulting from simultaneous coupling of the two magnets of the pair of magnets with the at least one coil; and wherein the at least one coil has at the center thereof an angular lag relative to the reference half-axis such that the two central lobes induced in each oscillation period of the mechanical resonator, in said effective functioning range, define said first and second lobes of the induced voltage signal.

10. The timepiece according to claim 9, wherein said angular lag is between 30° and 120° in absolute values.

11. The timepiece according to claim 9, wherein said pair of bipolar magnets is a first pair, said at least one coil is a first coil and said angular lag is a first angular lag;

wherein said electromagnetic assembly further comprises at least one second pair of bipolar magnets mounted on said balance at the same radial distance from the axis of rotation as the first pairs of bipolar magnets and having respective axes of magnetization with opposite polarities and an angular opening substantially identical to that of the first pair of bipolar magnets, and at least one second coil rigidly connected to the support of the mechanical resonator and wherein the center exhibits with the reference axis of the second pair of bipolar magnets a second angular lag substantially identical to the first angular lag;

wherein, when the resonator is resting, one of the first and second pairs of bipolar magnets is situated at equal angular distance from the first and second coils, said electromagnetic assembly comprising either a plurality of coils arranged such that a first median axis between the first and second pairs of bipolar magnets defines an axis of symmetry for said plurality of coils, or a plurality of pairs of bipolar magnets arranged such that a second median axis defines an axis of symmetry for said plurality of bipolar magnets; and wherein the various elements of said electromagnetic assembly are arranged such that the respective induced voltages in the at least one coil in question are added together constructively.

12. The timepiece according to claim 11, wherein the first and second angular lags each have substantially a value equal to 90°, said electromagnetic assembly comprising merely said first and second coils out of step by an angle of 180° and merely said first and second pairs of bipolar magnets also out of step by an angle of 180°.

13. The timepiece according to claim 11, wherein said electromagnetic assembly comprises said first and second coils which are out of step by an angle of 120° and three pairs of bipolar magnets one whereof is out of step by 120° with each of the two others.

14. The timepiece according to claim 1, wherein the electromagnetic assembly also partially forms the measuring device.

15. The timepiece according to claim 7, wherein the regulation device comprises a circuit for detecting a predetermined event in said induced voltage signal and a timer circuit associated with the logic control circuit which is arranged to activate said load pump in time zones outside the appearance of the first and second lobes of the induced voltage signal.

\* \* \* \* \*